US006272494B1

(12) United States Patent
Inoue

(10) Patent No.: US 6,272,494 B1
(45) Date of Patent: Aug. 7, 2001

(54) APPARATUS AND METHOD FOR SUPPORTING ACTUAL EFFECT INFORMATION DETERMINATION, AND MACHINE READABLE RECORDING MEDIUM WITH ACTUAL EFFECT INFORMATION DETERMINATION SUPPORTING PROGRAM RECORDED THEREIN

(75) Inventor: Yoshitsugi Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/040,674

(22) Filed: Mar. 18, 1998

(30) Foreign Application Priority Data

Oct. 17, 1997 (JP) .................................................. 9-285888

(51) Int. Cl.[7] ...................................................... G06F 17/30
(52) U.S. Cl. ........................ 707/100; 709/220; 709/224; 714/2; 714/25
(58) Field of Search .......................... 707/1–3, 100–102, 707/104; 706/15, 23; 702/35; 714/1, 2, 47, 37, 39, 20, 25, 26–33; 345/356; 709/220–224, 226

(56) References Cited

U.S. PATENT DOCUMENTS

| 4,885,712 | * | 12/1989 | Yamane ................................. 702/117 |
| 5,127,005 | * | 6/1992 | Oda et al. ............................... 714/26 |
| 5,479,573 | * | 12/1995 | Keeler et al. ........................... 706/23 |
| 5,497,335 | * | 3/1996 | Hoeller ............................. 364/470.14 |
| 5,528,752 | * | 6/1996 | Kise et al. ................................. 714/1 |
| 5,636,344 | * | 6/1997 | Lewis ..................................... 709/224 |
| 5,793,933 | * | 8/1998 | Iwamasa ................................. 706/50 |
| 5,845,272 | * | 12/1998 | Morjaria et al. ........................ 706/50 |
| 5,870,768 | * | 2/1999 | Hekmatpour .......................... 707/501 |
| 5,892,947 | * | 4/1999 | DeLong et al. ....................... 395/701 |
| 5,914,875 | * | 6/1999 | Monta et al. .......................... 364/184 |

FOREIGN PATENT DOCUMENTS

| 63-250247 | 10/1988 | (JP) . |
| 01201747 | 8/1989 | (JP) . |
| 02224001 | 9/1990 | (JP) . |

\* cited by examiner

Primary Examiner—Hosain T. Alam
(74) Attorney, Agent, or Firm—Helfgott & Karas, P.C.

(57) ABSTRACT

The present invention discloses a technique of determining actual effect information actually related to cause information occurring in a multiplexer having the function of multiplexing communication lines, and the redundancy function. It is an object of the invention to determine the actual effect information at a high speed by providing an information input portion to take as inputs cause information and effect information collected in relation to components of a network having a multiple hierarchical configuration, a storage portion to contain hierarchical data for mutually correlating the components of the network having the multiple hierarchical configuration, and a processing portion to retrieve the hierarchical data from the storage portion depending upon the cause information input into the information input portion, thereby using the retrieved hierarchical data to extract the effect information input into the information input portion so as to determine the actual effect information actually related to the cause information.

12 Claims, 19 Drawing Sheets

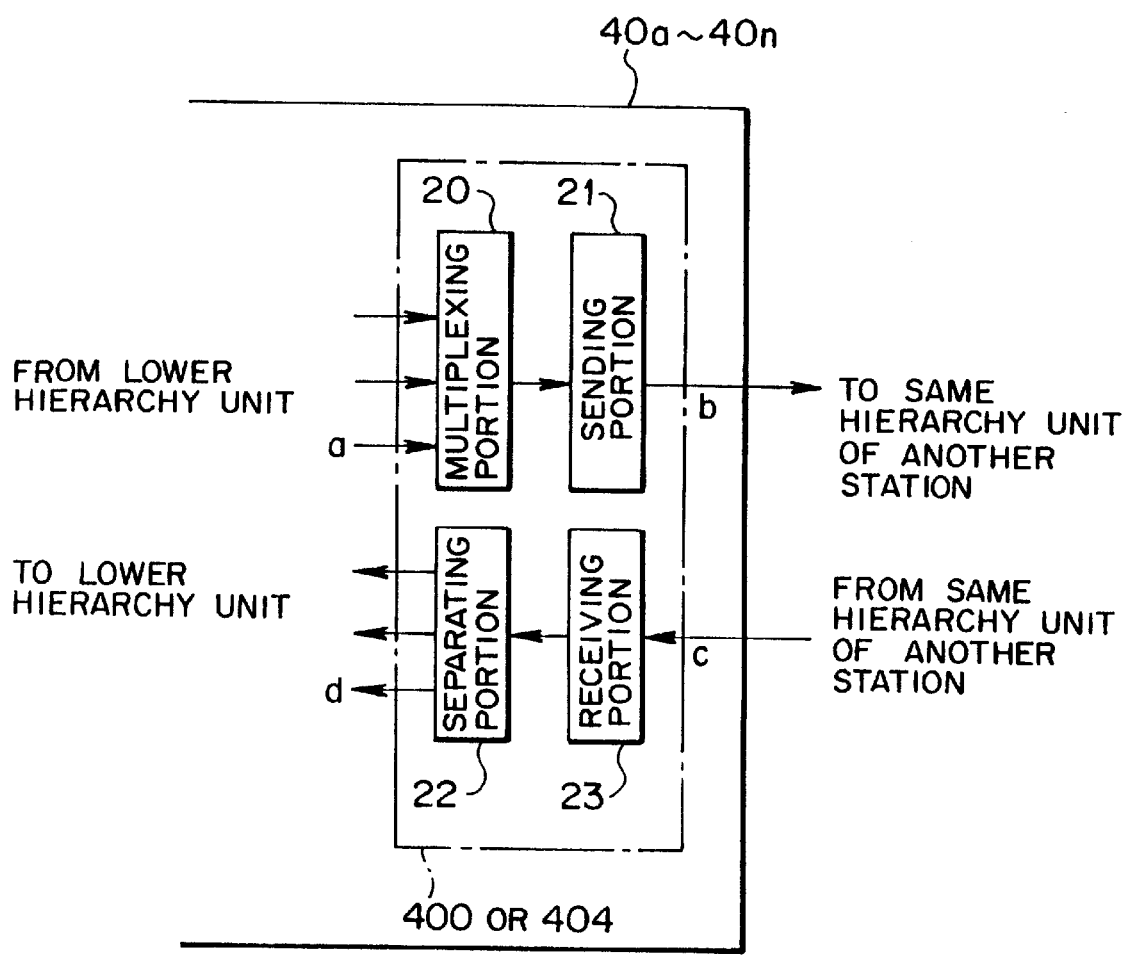

① DETECTION TIME INFORMATION
② INFORMATION DETECTION STATION IDENTIFICATION
③ INFORMATION DETECTION UNIT TYPE
④ INFORMATION DETECTION UNIT NUMBER
⑤ INFORMATION DETECTION POSITION (POSITION INFORMATION)
⑥ DETECTED INFORMATION TYPE
⑦ INFORMATION DETECTION STATUS IDENTIFICATION (CONTINUOUS OCCURRENCE, INSTANTANEOUS OCCURRENCE, AND RECOVERY)

APPARATUS AND METHOD FOR SUPPORTING ACTUAL EFFECT INFORMATION DETERMINATION, AND MACHINE READABLE RECORDING MEDIUM WITH ACTUAL EFFECT INFORMATION DETERMINATION SUPPORTING PROGRAM RECORDED THEREIN

BACKGROUND OF THE INVENTION (1) Field of the Invention

The present invention relates to an apparatus and method for supporting actual effect information determination, and a machine readable recording medium with an actual effect information determination supporting program recorded therein, all of which are suitable for use in a multiplexer having the function of multiplexing communication lines, and the redundancy function.

(2) Description of the Related Art

In type I carriers, type II carriers, electric-power companies, Japan Highway Public Corporation, Ministry of Construction, and other public institutions, individual wide area networks are generally operated by a transit network with a hierarchical configuration including a plurality of units having the function of multiplexing communication lines and the redundancy function. The transmission units in the transit network respectively offer communication services through a plurality of routes.

In such a business offering the communication service, the service may temporarily be stopped due to switching between the networks, or a problem on the network in order to, for example, enhance or maintain the network, or make preparations (tests) for inauguration of the service. Hence, it is important to provide a communication service to obtain information about the presence or absence of a line out of service, or information about the instantaneous service outage, thereby taking an appropriate action on a position at which a failure occurs, or providing necessary information to users.

In general, when the service is stopped, information detected in the transmission units is summarized, and the summarized information is used to detect the most significant path, the most significant unit, and the most significant hierarchy in each of the transmission units. Thus, it is possible to provide network capability outage information by retrieving from a database communication lines passing through paths, the units, and hierarchies. The database previously holds interconnections of the units configuring the network, a multiplexing structure, and interconnections of the hierarchies.

However, there is a problem in that, in the network providing the communication services as described above, it is impossible to create information to be stored in the database unless an operator is perfectly familiar with a multiplexing mechanism for the transmission units configuring the network, redundancy, a network configuration, and so forth.

Further, there is another problem in that appropriate information can not be provided due to a lack of information stored in the database, or inconsistency between information in the time-varying network configuration and the contents of the database. In addition, a further problem is that the database must be reorganized (updated) in order to realize real-time processing at a high speed, and several days may be required from storage processing for the database to inauguration of the database.

Besides, when switching of database is made according to, for example, a variation in redundancy mechanism of the transmission unit, or an alternative routing unit, database switching information is retrieved after the database is adapted to unit switching information or route switching information. Hence, as the database becomes larger, a longer time is required for an operation to follow the varying network configuration and retrieval, resulting in delayed provision of the information, and delayed actions on problems.

SUMMARY OF THE INVENTION

In view of the foregoing problems, it is an object of the present invention to provide an apparatus and method for supporting actual effect information determination, and a machine readable recording medium with an actual effect information determination supporting program recorded therein, in which a plurality of means are combined to determine actual effect information actually related to occurring cause information at a high speed.

According to the present invention, for achieving the above-mentioned objects, there is provided an apparatus for supporting actual effect information determination including an information input portion to take as inputs cause information and effect information collected in relation to components of a network having a multiple hierarchical configuration, a storage portion to previously contain hierarchical data for mutually correlating the components of the network having the multiple hierarchical configuration such that a cause component causing the cause information exerts an effect on only a component positioned in a hierarchy identical with or lower than that of the cause component, and a processing portion to retrieve the hierarchical data from the storage portion depending upon the cause information input into the information input portion, thereby using the retrieved hierarchical data to extract the effect information input into the information input portion so as to determine actual effect information actually related to the cause information.

Consequently, according to the apparatus for supporting actual effect information determination of the present invention, the actual effect information actually related to the cause information is determined by the input cause information and the input effect information depending upon the hierarchical data for mutually correlating the components of the network having the multiple hierarchical configuration. It is thereby possible to rapidly grasp a status of the network operated according to the complex and sophisticated autonomic control function, resulting in an advantage of enhanced performance of the unit.

According to the present invention, there is provided an apparatus for supporting actual effect information determination in which a preprocessing portion preprocesses the cause information and the effect information input into the information input portion, and the processing portion retrieves the hierarchical data from the storage portion depending upon the cause information preprocessed in the preprocessing portion, thereby using the retrieved hierarchical data to extract the effect information preprocessed in the preprocessing portion so as to determine the actual effect information.

Consequently, according to the apparatus for supporting actual effect information determination of the present invention, since the preprocessing is made to the input cause information and the input effect information, it is possible to reduce the number of cause information and the number of effect information serving as a candidate for the decision processing. It is possible to reduce the number of times the cause information is repeatedly correlated with the actual effect information, resulting in an advantage of an enhanced processing speed of the unit.

According to the present invention, there is provided an apparatus for supporting actual effect information determination in which the preprocessing portion includes a forced recovery information storage portion to contain forced recovery information defined as information in relation to a component exerting no effect on the network even when the cause information occurs, and a first filter portion to remove the forced recovery information stored in the forced recovery information storage portion from among the cause information and the effect information input into the information input portion.

Consequently, according to the apparatus for supporting actual effect information determination of the present invention, the forced recovery processing is made to the information about the component having no effect on the network even when the cause information occurs among the input cause information and the input effect information. It is possible to provide an additional station for the network without retrying storage of hierarchical data, and reduce the number of actual effect information serving as a candidate for decision processing by previously removing the cause information detected during operations related to the transmission unit and other positions.

According to the present invention, there is provided an apparatus for supporting actual effect information determination in which the preprocessing portion includes a dummy recovery information storage portion to contain dummy recovery information defined as information in relation to a component continuously causing the cause information, and a second filter portion to remove the dummy recovery information stored in the dummy recovery information storage portion from among the cause information and the effect information input into the information input portion.

Consequently, according to the apparatus for supporting actual effect information determination of the present invention, the dummy recovery processing is made to the information about the component continuously causing the cause information among the input cause information and the input effect information. It is possible to automatically place in recovered states and erase the cause information and the effect information occurring in the station and the transmission unit, and reduce the number of effect information serving as a candidate for the decision processing, resulting in an advantage in that a decision of actual effect information can rapidly be made.

According to the present invention, there is provided an apparatus for supporting actual effect information determination including means for, when a state of continuous occurrence of the cause information is recovered, removing corresponding dummy recovery information from the dummy recovery information storage portion.

Consequently, according to the apparatus for supporting actual effect information determination of the present invention, the corresponding dummy recovery information is removed from the dummy recovery information storage portion when the state of continuously occurrence of the cause information is recovered. Thus, it is possible to set the recovered cause information to become a candidate for a decision of actual effect information, resulting in an advantage in that the decision of actual effect information can surely be made for all the input cause information.

According to the present invention, there is provided an apparatus for supporting actual effect information determination in which the processing portion sets a time zone for information aggregation, and retrieves the hierarchical data from the storage portion depending upon the cause information input into the information input portion in the aggregation time zone, thereby using the retrieved hierarchical data to extract the effect information input into the information input portion in the aggregation time zone so as to determine the actual effect information.

According to the present invention, there is provided an apparatus for supporting actual effect information determination in which the time zone is set with reference to a time point when the cause information is detected.

Consequently, according to the apparatus for supporting actual effect information determination of the present invention, the actual effect information is determined by extracting the effect information input into the information input portion in the aggregation time zone. Thus, it is possible to more accurately and efficiently correlate the detected cause information with the effect information.

According to the present invention, there is provided an apparatus for supporting actual effect information determination in which the processing portion includes an effect direction decision portion to make a decision of a direction affected by the cause information and the effect information input into the information input portion, a retrieval range determining portion to determine a range of retrieval of the storage portion by referring to the direction of which the decision is made in the effect direction decision portion, and a determining portion to retrieve the hierarchical data from the storage portion depending upon the range of retrieval determined in the retrieval range determining portion, thereby using the retrieved hierarchical data to extract the effect information input into the information input portion so as to determine the actual effect information.

Consequently, according to the apparatus for supporting actual effect information determination of the present invention, the decision is made of the direction affected by the cause information and the effect information, and the range of retrieval of the storage portion is determined by referring to the direction of which the decision is made. As a result, there is an advantage in that the actual effect information can easily be selected from among the many input effect information.

According to the present invention, there is provided a method for supporting actual effect information determination including the storage step of previously storing hierarchical data for mutually correlating components of a network having a multiple hierarchical configuration such that a cause component causing cause information collected in relation to the component of the network having the multiple hierarchical configuration exerts an effect on only a component positioned in a hierarchy identical with or lower than that of the cause information, the information input step of inputting the cause information and the effect information in real time, and the processing step of retrieving, at intervals of a predetermined time, the hierarchical data from the storage portion depending upon the cause information input in the information input step, thereby using the retrieved hierarchical data to extract the effect information input in the information input step so as to determine actual effect information actually related to the cause information.

Consequently, according to the method for supporting actual effect information determination of the present invention, the actual effect information actually related to the cause information is determined by the input cause information and the input effect information depending upon the hierarchical data for mutually correlating the components of the network having the multiple hierarchical configuration. As a result, there is an advantage in that it is possible to rapidly grasp a status of the network operated according to the complex and sophisticated autonomic control function, and enhance throughput of the unit.

According to the present invention, there is provided a machine readable recording medium with an actual effect information determination supporting program recorded therein. The recording medium executes the information input procedure for inputting cause information and effect information collected in relation to components of a network having a multiple hierarchical configuration, and the processing procedure for retrieving, depending upon the cause information input in the information input procedure, hierarchical data from a storage portion containing the hierarchical data for mutually correlating components of a network having a multiple hierarchical configuration such that a cause component causing the cause information exerts an effect on only a component positioned in a hierarchy identical with or lower than that of the cause component, thereby using the retrieved hierarchical data to extract the effect information input in the information input procedure so as to determine actual effect information actually related to the cause information.

Consequently, according to the machine readable recording medium with the actual effect information determination supporting program recorded therein of the present invention, it is possible to hold the machine readable recording medium with the actual effect information determination supporting program recorded therein, and perform the actual effect information determination processing by using the recording medium, resulting in great expectations for the widespread use of the unit.

BRIEF DESCRIPTION OF THE DRAWINGS

FIG. 4 is a diagram for explaining an internal configuration of a transmission unit in the station according to one embodiment of the present invention;

DESCRIPTION OF THE PREFERRED EMBODIMENTS

A description will now be given of an embodiment of the present invention referring to the accompanying drawings.

(a) Descriptions of Multiple Hierarchical Configuration and Redundancy of Transmission Unit First, detailed descriptions will now be given of a network to which an actual effect information determination supporting unit according to the embodiment of the present invention can be applied, and a multiple hierarchical configuration of a transmission unit installed in a station configuring the network.

Figure 2:
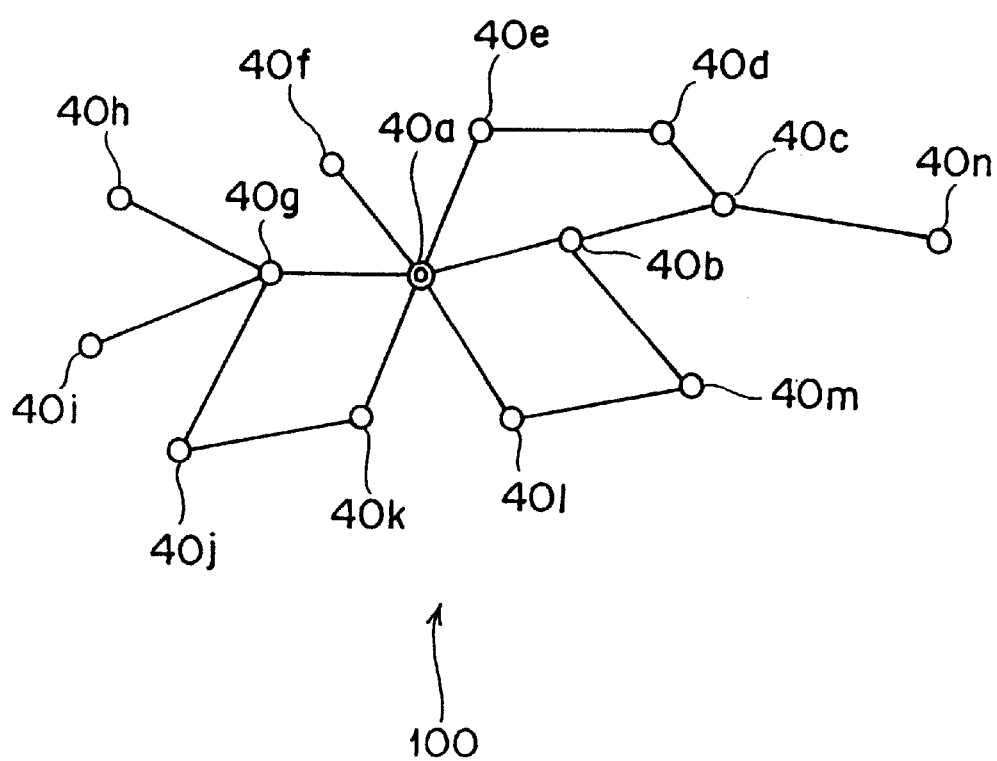
FIG. 2 is a diagram showing interconnections in a network configured by a plurality of stations according to the embodiment of the present invention.

FIG. 2 is a diagram showing interconnections of stations in the network configured by the plurality of stations. The stations 40$a$ to 40$n$ shown in FIG. 2 are, for example, stations (such as switching station) separately located over a wide area, and accommodating the transmission units. In a network 100 shown in FIG. 2, the stations 40$a$ to 40$n$ are interconnected complicatedly. Moreover, the station 40$a$ (see symbol "⊙" in FIG. 2) serves as a main station among the plurality of stations configuring the network 100. The station 40$a$, however, is configured as in the remaining stations 40$b$ to 40$n$ (see symbol "○" in FIG. 2).

Specifically, the network 100 shown in FIG. 2 includes a plurality of networks such as linear network (configured by, for example, the stations 40a, 40b, 40c, and 40n), a loop network (configured by, for example, the stations 40a, 40b, 40c, 40d, and 40e), and a star network (configured by, for example, the stations 40a, 40b, 40e, 40f, 40g, 40k, and 40l).

Further, in the network 100, apart from the network configuration, information collecting units (not shown) are installed in the stations 40a to 40n to collect failure information (failure detection information) occurring in the stations 40a to 40n. Then, the failure information collected by the information collecting units are sent to a centralized supervisory unit (installed in an office or the like, but not shown) for the network 100. The supervisory unit is used to perform desired processing for the stations 40a to 40n in response to the failure information. For example, the network 100 shown in FIG. 2 is under the centralized supervision of the station 40a.

Figure 3A:
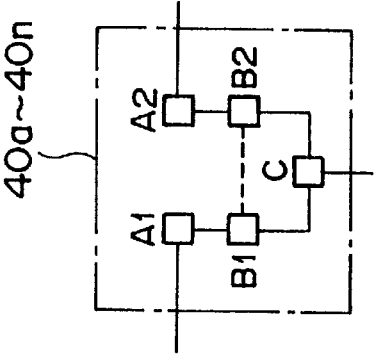
FIG. 3($a$) is a general diagram for explaining a multiple hierarchical configuration in the station according to one embodiment of the present invention, and FIG. 3($b$) is a diagram typically showing the configuration in detail.
Figure 3B:
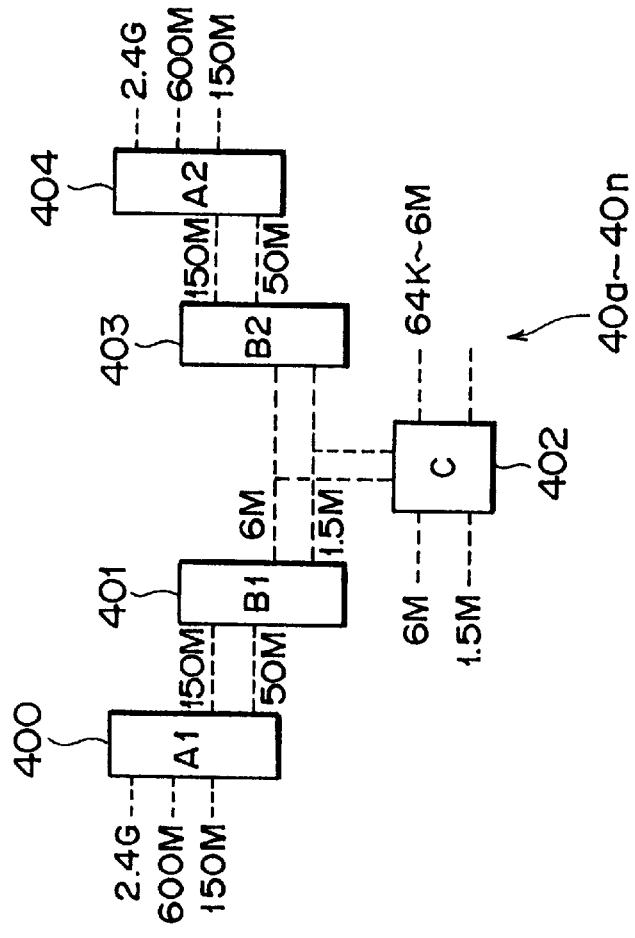

FIGS. 3(a) and 3(b) are diagrams for explaining the multiple hierarchical configuration in each of the stations 40a to 40n. As shown in FIG. 3(a), the transmission units are hierarchically arranged in each of the stations 40a to 40n. In the illustration, the hierarchical configuration is organized by transmission units A1, A2 serving as most significant hierarchy units, transmission units B1, B2 as medium hierarchy units, and a transmission unit C as a least significant hierarchy unit (in the hierarchical order of A>B>C).

Specifically, the transmission units A1, A2, B1, B2, and C respectively correspond to transmission units 400 to 404 shown in FIG. 3(b).

Here, the transmission unit 400 (see reference numeral A1) and the transmission unit 404 (see reference numeral A2) shown in FIG. 3(b) accommodate three types of lines having transmission speeds of 2.4 Gbps, 600 Mbps, and 150 Mbps, and take as inputs therethrough information from the remote stations (the stations 40b to 40n if a local station is the station 40a, and the same holds true for the respective stations). The transmission units can convert the input information into information with a transmission speed of 150 Mbps or 50 Mbps, and can output the results.

Specifically, the information input from any one of the three types of lines is output after being converted into information with any one of the transmission speeds of 150 Mbps and 50 Mbps. However, in the transmission units 400, 404, input information is transmitted in mutually opposite directions.

That is, when the information is transmitted from the transmission unit 400 to the transmission unit 404, the transmission unit 400 takes as input data having any one of the three transmission speeds (of 2.4 Gbps, 600 Mbps, and 150 Mbps) through one of the accommodated lines, and outputs the data after converting the transmission speed of the data into the desired transmission speed (of 150 Mbps or 50 Mbps).

On the other hand, when the information is transmitted from the transmission unit 404 to the transmission unit 400, the transmission unit 404 similarly takes as input data having any one of the three transmission speeds through one of the accommodated lines, and outputs the data after converting the transmission speed of the data into the desired transmission speed.

Further, the transmission unit 401 (see reference numeral B1) and the transmission unit 403 (see reference numeral B2) respectively accommodate two types of lines having transmission speeds of 150 Mbps and 50 Mbps, and can output information after converting a transmission speed thereof into a transmission speed of 6 Mbps or 1.5 Mbps.

In addition, the transmission unit 402 (see reference numeral C) accommodates lines having transmission speeds of 6 Mbps and 1.5 Mbps, and can output information after converting a transmission speed thereof into transmission speeds ranging from 6 Mbps to 64 Kbps.

Moreover, it will be appreciated that the above transmission speeds are for illustrative purpose only, and the transmission units may have transmission speeds other than the above transmission speeds.

Meanwhile, as shown in, for example, FIG. 4, each of the transmission units 400 to 404 includes a multiplexing portion 20, a sending portion 21, a separating portion 22, and a receiving portion 23. FIG. 4 illustrates the most significant hierarchy units among the transmission units 400 to 404 arranged in a hierarchical configuration, that is, the transmission units 400, 404.

In the illustration, the multiplexing portion 20 is a component for multiplexing of information sent from a lower hierarchy unit. For example, in the transmission unit 404, information having the transmission speed of 150 Mbps or 50 Mbps, input from the transmission unit 403 serving as a lower hierarchy unit, is multiplexed and converted into information having the transmission speed of 2.4 Gbps, 600 Mbps, or 150 Mbps.

The sending portion 21 sends the information multiplexed in the multiplexing portion 20 to the same hierarchy unit in a remote station. The receiving portion 23 receives information sent from the same hierarchy unit in a remote station.

Further, the separating portion 22 separates the information received in the receiving portion 23. For example, the transmission unit 404 separates information having the transmission speed of 2.4 Gbps, 600 Mbps, or 150 Mbps, input from a remote station, and converts the information into information having the transmission speed of 150 Mbps or 50 Mbps.

Though a description has been given of the transmission units 400, 404, the same holds true for the remaining units 401 to 403. Information output from the sending portion 21 is transmitted to an upper hierarchy unit in the local station, and the receiving portion 23 receives information transmitted from an upper hierarchy unit in the local station.

The transmission units 400 to 404 shown in FIG. 4 detect failure information occurring in the stations 40a to 40n. Specifically, in the transmission unit 400 or 404 shown in FIG. 4, reference mark "a" denotes information detected before the processing in the multiplexing portion 20, "b" is information detected by the sending portion 21, "c" is information detected by the separating portion 22, and "d" is information detected by the receiving portion 23. The detected information "a" to "d" will be described infra referring to FIGS. 8 and 9.

Further, the failure information contains, for example, cause information and spreading information (effect information). It is to be noted that the cause information shows information occurring at a position at which a failure (problem) occurs in the stations 40a to 40n, and the spreading information is information (guide information) showing, in response to the occurring cause information, network capability outage in an upper hierarchy or the same hierarchy on the transmission line.

That is, in the stations 40a to 40n (see FIG. 2) in the network 100, when the cause information occurs (the failure information is detected) at a certain position in the stations 40a to 40n, the effect information in response to the cause information spreads according to the position.

Specifically, the cause information means the information (see reference marks "a", "b", "c", and "d" in FIG. 4)

detected by the multiplexing portion 20, the sending portion 21, the separating portion 22, and the receiving portion 23, information showing reception of the cause information or the spreading information in a receiving portion 23 in a remote station, information (such as power source information, and clock information) common to the transmission units, and redundancy switching information (information transmitted to another route obtained by switching in the redundancy) described infra.

If a code transmission error or information due to an unclear cause is detected, information called single information is detected.

The multiple hierarchical configuration of the transmission units 400 to 404 installed in each of the stations 40a to 40n has been described referring to FIGS. 3 and 4. The next description will be given of the redundancy of the transmission units installed in the stations 40a to 40n referring to FIG. 5.

Figure 5:
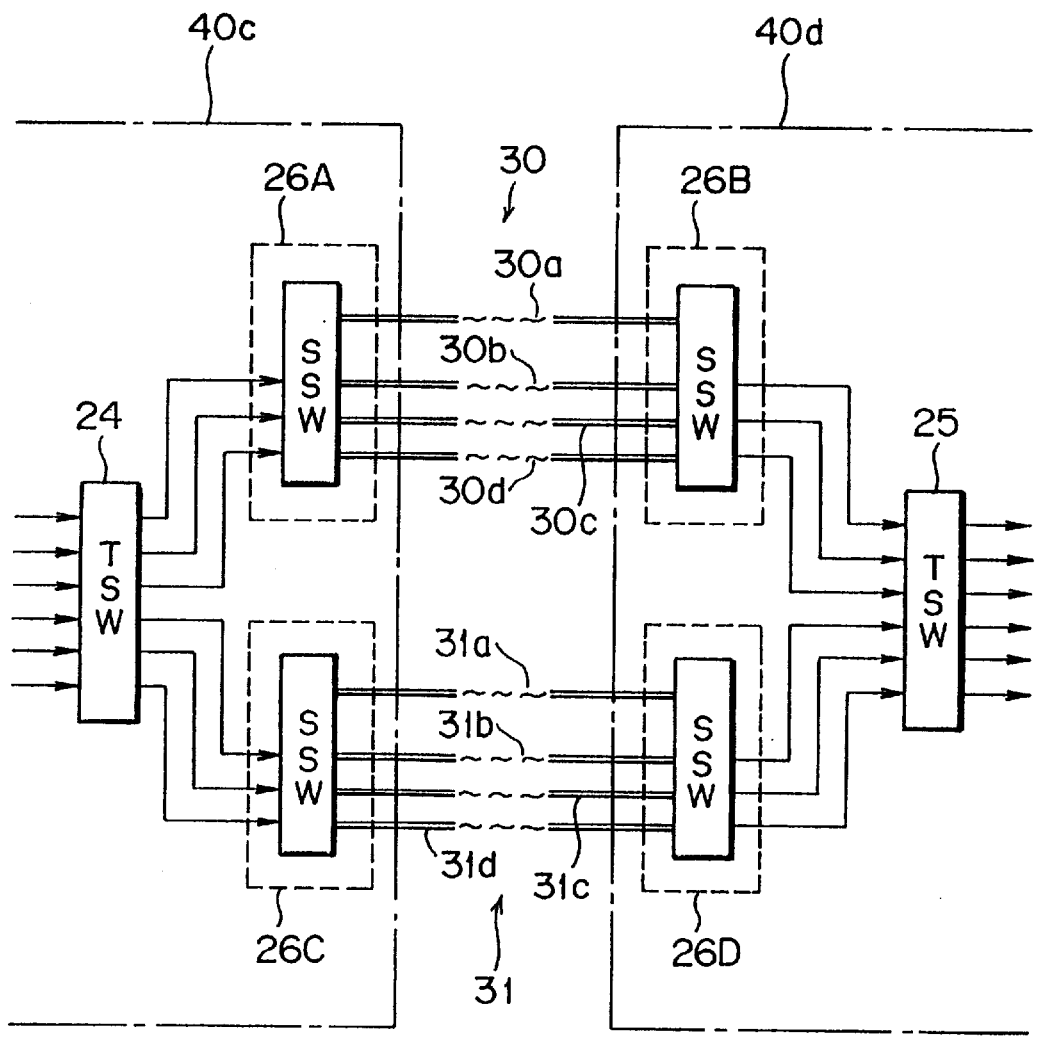
FIG. 5 is a diagram for explaining redundancy and a multiple route configuration in the transmission unit according to one embodiment of the present invention.

Specifically, the stations 40c, 40d shown in FIG. 5 include time switches (TSWs) 24; 25, and space switches (SSWs) 26A, 26C; 26B, 26D.

In the illustration, the space switches (SSWs) 26A to 26D function as a switch for space division switching of a signal. The time switches (TSWS) 24, 25 are a switch for time division switching of a signal.

Further, in FIG. 5, the space switches 26A and 26B are mutually connected through a transmission line 30 including (a multiple route configuration) three current routes 30b, 30c, and 30d, and one spare route 30a. The space switch 26A or 26B allows switching from the current routes 30b to 30d to the spare route 30a.

That is, transmission of information is normally made by using all the current routes 30b to 30d. When any one of the current routes 30b to 30d becomes unavailable due to a failure, or the like, the spare route 30a can be used by the switching.

For example, in the case of transmission of information through the space switch 26A from the time switch 24 as shown in FIG. 5, the space switch 26B for receiving the information can detect that no information is transmitted from any one of the current routes 30b to 30d, thereby allowing the switching to the spare route 30a.

Further, when the two or more routes are unavailable among the current routes 30b to 30d extending between the space switches 26A and 26B, a sufficient support can not be provided by only the spare route 30a. In this case, switching can be done from the unavailable routes to the remaining transmission line (the transmission line 31 in the discussion) as long as the remaining transmission line has an available route.

In the case of transmission of information through the transmission line 30 from the time switch 24 as shown in FIG. 5, the time switch 25 for receiving the information allows the switching to the remaining transmission line 31.

Further, as in the space switches 26A, 26B, the space switches 26C and 26D are mutually connected through the transmission line 31 including three current routes 31b, 31c, and 31d, and one spare route 31a. Thus, in the state as described above, the time switch 25 allows switching from all the routes of the transmission line 30 to the routes of the transmission line 31. It is thereby possible to provide the same transmission of information in the transmission line 31 as transmission of information by the transmission line 30.

That is, as described above, the network 100 can contain as the cause information the information (the switching information) transmitted to another route obtained by the switching in the redundancy. Hence, effect information spreads in response to the cause information.

It must be noted that the method of route switching permits not only the switching of all the routes as stated above but also switching from a route of low priority to one route of the remaining transmission line. That is, when failures occur on the current routes 30b, 30c of the transmission line 30, it is possible to perform switching from the current route 30b to the spare route 30a, and perform switching from the current route 30c with a lower priority than that of the current route 30b to any one of the current routes 31b to 31d of the remaining transmission line 30.

As a preparation to a multiple failure occurring in the plurality of routes, a dedicated control unit (not shown) is installed to perform a switching operation.

Further, when the cause information occurs in the transmission unit in the above redundancy, the transmission unit is disconnected from the network 100 by any one of the space switches 26A to 26D, or any one of the time switches 24, 25 according to a position at which the cause information occurs.

Though, for convenience sake, the one-way transmission is made between the stations 40c and 40d shown in FIG. 5, it is to be noted that two-way transmission can be provided in actuality. Though the detailed description has been given of the stations 40c, 40d referring to FIG. 5, it must be understood that the remaining stations 40a, 40b, and 40e to 40n can similarly function.

(b) Description of One Embodiment of the Invention

Figure 1:
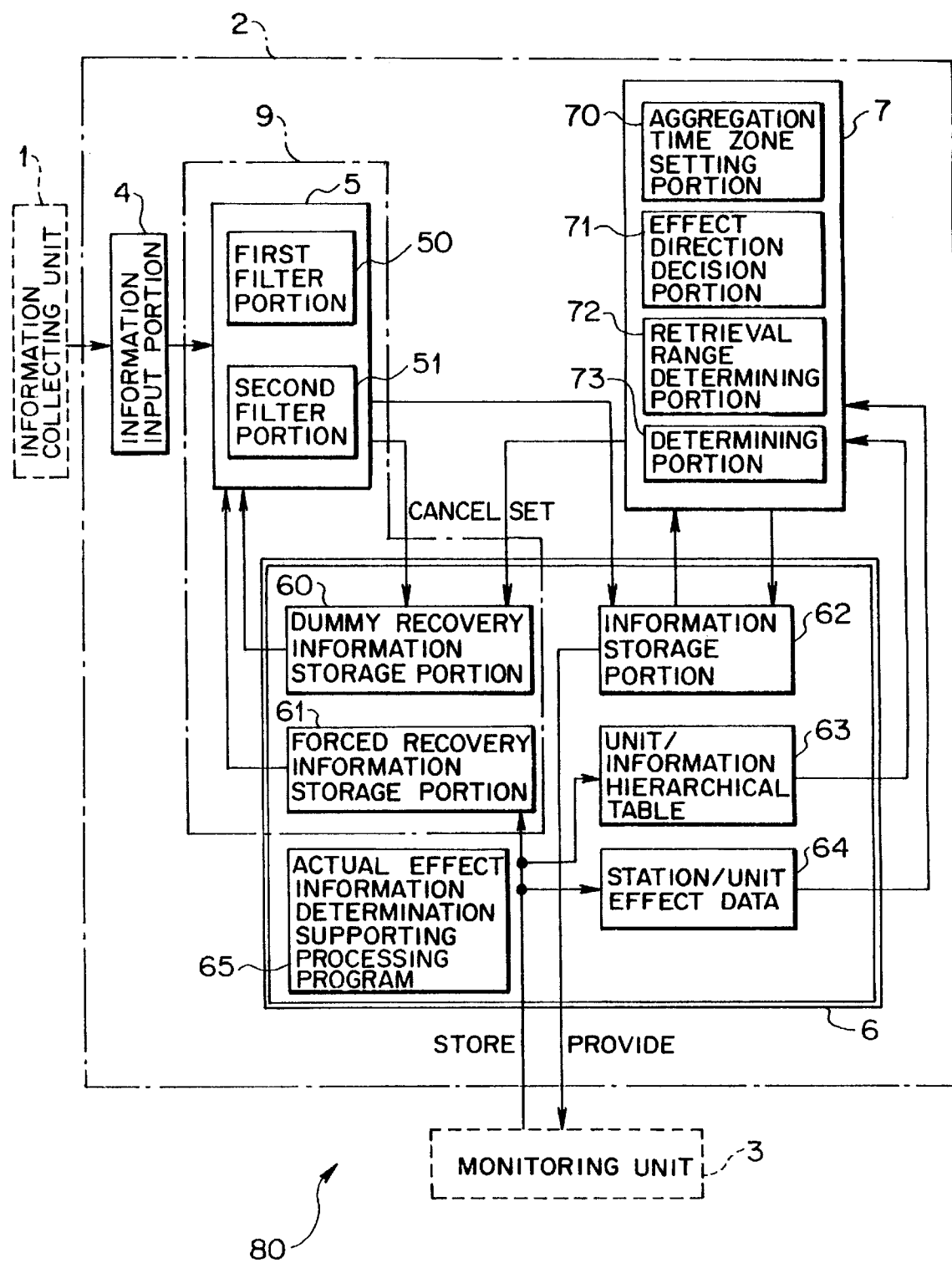
FIG. 1 is a block diagram showing a configuration of an actual effect information determination supporting unit according to one embodiment of the present invention.

FIG. 1 is a block diagram showing an actual effect information determination supporting unit according to one embodiment of the present invention. As shown in FIG. 1, an actual effect information determination supporting system 80 includes an information collecting unit 1, an actual effect information determination supporting unit 2, and a monitoring unit 3.

The information collecting unit 1 is mounted in the stations 40a to 40n of the network 100 to collect the cause information and the effect information about components (such as station, and transmission unit) of the network 100 (see FIG. 2) having the multiple hierarchical configuration.

Further, the actual effect information determination supporting unit 2 performs desired processing in response to the cause information and the effect information input from the information collecting unit 1, thereby making decisions of the occurring cause information and the actual effect information actually related thereto. The actual effect information determination supporting unit 2 includes an information input portion 4, a filter 5, a database portion 6, and a processing portion 7, all of which will be described infra.

For monitoring, the monitoring unit 3 sets a condition required to determine the actual effect information in the actual effect information determination supporting unit 2. The monitoring unit 3 can store, in the database portion 6 described infra, data required for processing performed in the actual effect information determination supporting unit 2, and can check the information obtained in the actual effect information determination supporting unit 2.

The information input portion 4 mounted in the actual effect information determination supporting unit 2 takes as inputs the cause information and the effect information from the information collecting unit 1. The cause information and the effect information detected in the transmission units 400 to 404 (see FIG. 3) are input into the information input portion 4 in real time.

Figure 6:
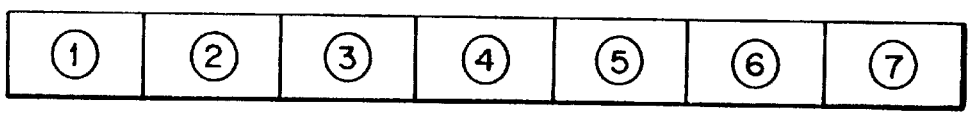
FIG. 6 is a diagram showing the contents of input information according to one embodiment of the present invention.

Specifically, the information are input into the information input portion 4 according to a frame format by which the contents of the information can be identified as shown in FIG. 6. The frame format regularly accommodates information such as detection time, information detection station, the type of information detection unit, information detection unit number, information detection position, the type of detected information, and information detection status in the order of ① to ⑦ shown in FIG. 6.

Here, the detection time information (①) shows a time when a failure occurs, the information detection station identification information (②) is used to identify the stations 40a to 40n (see FIG. 2) in which failure information is detected, and the information detection unit type information (③) shows the type of transmission unit in which the failure information is detected.

Besides, the information detection unit number information (④) shows the number of the transmission unit in which the failure information is detected, the information detection position information (⑤) is position information showing a position at which the information is detected, and the detected information type information (⑥) shows the type of detected information, i.e., shows whether the information is the cause information or the effect information.

Further, the information detection status information (⑦) shows a status of the detected information, which allows identification of "continuous occurrence information", "instantaneous occurrence information", and "recovery information". Specifically, the "continuous occurrence information" shows a state in which the failure information continuously occurs for a predetermined time period or more, and is currently occurring. The "instantaneous occurrence information" shows that the failure information occurs, and is thereafter recovered within a predetermined time period. For example, the redundancy and a route control mechanism (see FIG. 5) of the transmission unit disconnects the position at which the failure information occurs. As a result, the "instantaneous occurrence information" occurs in a line in which spreading effect information is recovered. In addition, the "recovery information" occurs in a line in which occurring failure information is recovered.

Thus, depending upon the contents of information input through the information collecting unit 1, it is possible to determine whether or not the network 100 can be relieved by the autonomic control function (the switching control function for the redundancy and the multiple route configuration shown in FIG. 5) or a control of the dedicated control unit (not shown). It is thereby possible to easily grasp a detailed status of the position at which the failure information is detected. However, the contents of service provided for the stations 40a to 40n can not be recognized by the input information.

Further, the filter 5 shown in FIG. 1 selects necessary information from among the cause information and the effect information input into the information input portion 4, and includes a first filter portion 50 and a second filter portion 51.

Specifically, the filter 5 uses the first filter portion 50 and the second filter portion 51 to erase information unrelated to detection of the actual effect information and unnecessary information depending upon information stored in the database portion 6 described infra. Detailed descriptions will later be given of the first filter portion 50 and the second filter portion 51.

Further, the database portion 6 holds data for defining to which of the stations 40a to 40n and to which transmission unit of the transmission units 400 to 404 effect information spreads in response to the cause information detected by all the stations 40a to 40n in the network 100. The database portion 6 includes a dummy recovery information storage portion 60, a forced recovery information storage portion 61, an information storage portion 62, a unit/information hierarchical table 63, station/unit effect data 64, and an actual effect information decision supporting processing program 65.

In the dummy recovery information storage portion 60 is stored dummy recovery information defined as information related to a component in which the cause information continuously occurs. The second filter portion 51 removes the dummy recovery information stored in the dummy recovery information storage portion 60 from the cause information and the effect information input into the information input portion 4.

Specifically, multiple causes in the network 100 never lead to concurrent occurrence of pieces of cause information so that the pieces of cause information are typically transmitted to the information collecting unit 1 with differences in time. The network does not always completely recover from the preceding failure. Hence, a decision is made of the cause information which has occurred, and the cause information is stored as dummy recovery information before the next cause information occurs. As a result, the cause information after the decision is replaced by the dummy recovery information assuming that the cause information is recovered.

In other words, the above-mentioned dummy recovery processing is incorporated in the network 100. When the cause information occurs at a certain position, according to the dummy recovery processing, the position at which the cause information occurs is disconnected from the network 100 by the space switches (SSWs) 26A to 26D and the time switches (TSWs) 24, 25 in the transmission units 400 to 404 described referring to FIG. 5. This erases the cause information with no effect on the network 100.

In later processing, even when failure information requiring the dummy recovery processing is continuously detected, the failure information is automatically placed in a recovered state, and is erased. It is thereby possible to rapidly and immediately make a decision of actual effect information which is actually related.

After the cause information recovers from the state in which the cause information continuously occurs (continuous occurrence state) through the dummy recovery processing as described above, corresponding dummy recovery information is removed from the dummy recovery information storage portion 60. That is, the continuously occurring cause information can be recovered by the recovery processing, and recovery information (see "recovery information" in FIG. 5) is posted if the recovery is successful. Thus, in the network 100, the position at which the cause information occurs is not a candidate for the dummy recovery processing.

In other words, when the certain cause information is stored as the dummy recovery information, and is incorporated in the network 100, the cause information, replaced by the dummy recovery information, automatically becomes unmonitored information used for the dummy recovery processing. The recovery information (restoration information) showing recovery of the cause information stored as the dummy recovery information is posted to the actual effect information determination supporting unit 2. In the actual effect information determination supporting unit 2, the processing is performed to detect information having the same position as that at which the recovery information is detected so as to erase the stored dummy recovery information.

The forced recovery information storage portion 61 contains forced recovery information defined as information related to a component which does not exert an effect on the network 100 even when the cause information occurs. The first filter portion 50 removes the forced recovery information stored in the forced recovery information storage portion 61 from the cause information and the effect information input into the information input portion 4.

In general, the network 100 has a configuration always varying because of, for example, installation of an additional station. Operations such as enhancement of the network, preparations for inauguration of the service, and recovery of a problem position are carried out after the disconnection from the network 100.

In particular, the cause information showing the problem position can be recovered independent of the network 100 so that no problem and no effect are caused in the network 100. However, with the problem position disconnected from the network 100, repetition of the recovery processing for the problem position may possibly interfere with a performance of the actual effect information processing.

Hence, the forced recovery information is previously stored in the actual effect information determination supporting unit 2. By using the forced recovery information, it is possible to previously erase (remove) the cause information detected during the operations related to the transmission units 400 to 404 and the problem position. That is, when the cause information corresponding to the forced recovery information is input into the information input portion 4, the cause information is forcedly placed in a recover state. Moreover, the monitoring unit 3 is used to store the forced recovery information in the forced recovery information storage portion 61.

Specifically, the forced recovery information includes information for placing all information output from the corresponding transmission units 400 to 404 in recovered states (that is, station information, and unit number information), information for placing in recovered states all information output from the unit having the above unit number in addition to the above information (that is, station information, unit number information, and unit information), and information for placing in recovered states all information output from a SYS (SYSTEM) number (multiplexing group) in the unit in addition to the above information (that is, station information, unit number information, unit information, and SYS number information).

The forced recovery information further includes information for placing in recovered states all information output from an IF (interface unit) in the SYS (SYSTEM) number in addition to the information output from the respective positions (that is, station information, unit number information, unit information, SYS number information, and interface unit information), information for placing in recovered states all information output from a path in the interface unit in addition to the above information (that is, station information, unit number information, unit information, SYS number information, interface unit information, and path number information), and information for placing in recovered states information output from an accommodation position in the path number in addition to the above information (that is, information covering all levels from a station level to a line accommodation number level).

That is, at any given time, it is possible to optionally set the forced recovery information according to a position at which cause information is detected.

Further, the actual effect information determination supporting unit 2 allows the corresponding cause information to be a candidate for monitoring without replacing the cause information by forced recovery information. In this case, it is sufficient to cancel the forced recovery information. An operator cancels the forced recovery information when, for example, the transmission units 400 to 404 and other positions are connected to the network 100 after the completion of recovery operations thereof.

The filter 5 (the first filter portion 50 and the second filter portion 51), the dummy recovery information storage portion 60, and the forced recovery information storage portion 61 form a preprocessing portion 9 to preprocess the cause information and the effect information input into the information input portion 4.

That is, the preprocessing portion 9 removes operation information and processed information from the information input into the information input portion 4. The remaining information (that is, information containing the actual effect information) obtained by removal in the preprocessing portion 9 is stored in the information storage portion 62 described infra.

Further, in the information storage portion 62 shown in FIG. 1 is stored processing target information obtained by determination of the actual effect information in the processing portion 7 described infra. The monitoring unit 3 instructs the information storage portion 62 to perform storage/provision of the processing target information. For example, the information storage portion 62 temporarily holds information (processing target information) obtained in the preprocessing portion 9 described above. The remaining processing target information will be described later.

Besides, in the information storage portion 62 is stored information obtained by aggregation of the cause information input into the information input portion 4 shown in FIG. 1 in a predetermined time zone. That is, the system 80 collects and processes all failure information detected by the transmission units 400 to 404 in the stations 40a to 40n configuring the network 100. Even when two or more pieces of cause information occur at the same time, the pieces of cause information are input into the information input portion 4 from the stations 40a to 40n with inevitable time lags. The time lags are generated because of, for example, a network configuration, or a method of transmission until the cause information is collected by the information collecting unit 1 (see FIG. 1). That is, the actual effect information determination supporting unit 2 can not accurately grasp in which time zone the effect information to be a candidate for processing reaches.

Hence, there is provided the predetermined time zone (aggregation time zone; see interval T in FIG. 7) in the vicinity of a time when the cause information is detected or a time when the cause information reaches. Thus, all effect information input in the time zone is a candidate for processing about certain cause information.

Figure 7:
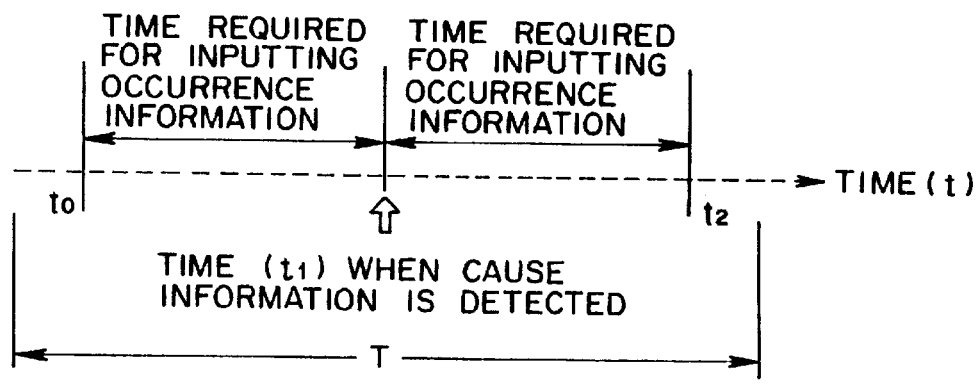
FIG. 7 is a diagram for explaining a method of setting an aggregation time zone by a processing portion according to one embodiment of the present invention.

That is, as shown in FIG. 7, predetermined times (t0 to t1, and t1 to t2) required for input are set with reference to the time point (see reference numeral t1) when the cause information is detected, thereby providing the time zone in which the effect information can be received. As long as the information reaches in the time zone, all the information is processed because it is decided that all the information spreads in response to the cause information occurring at the time point t1. The aggregation time zone can be set by the processing portion 7 described infra.

Further, in the information storage portion 62 is stored information used for making a decision of a direction in which an effect is exerted by the failure information input into the information input portion 4. Specifically, in the transmission units 400 to 404 in the stations 40a to 40n, when the cause information occurs, effect information in response thereto spreads in two directions, i.e., toward a remote unit and a lower hierarchy.

Hence, the cause information and the effect information spreading in response to the cause information are correlated with each other according to the above information type (see reference numeral ⑥ in FIG. 6), and are stored in the information storage portion 62 with retrieval targets (directions) separated.

Figure 8:
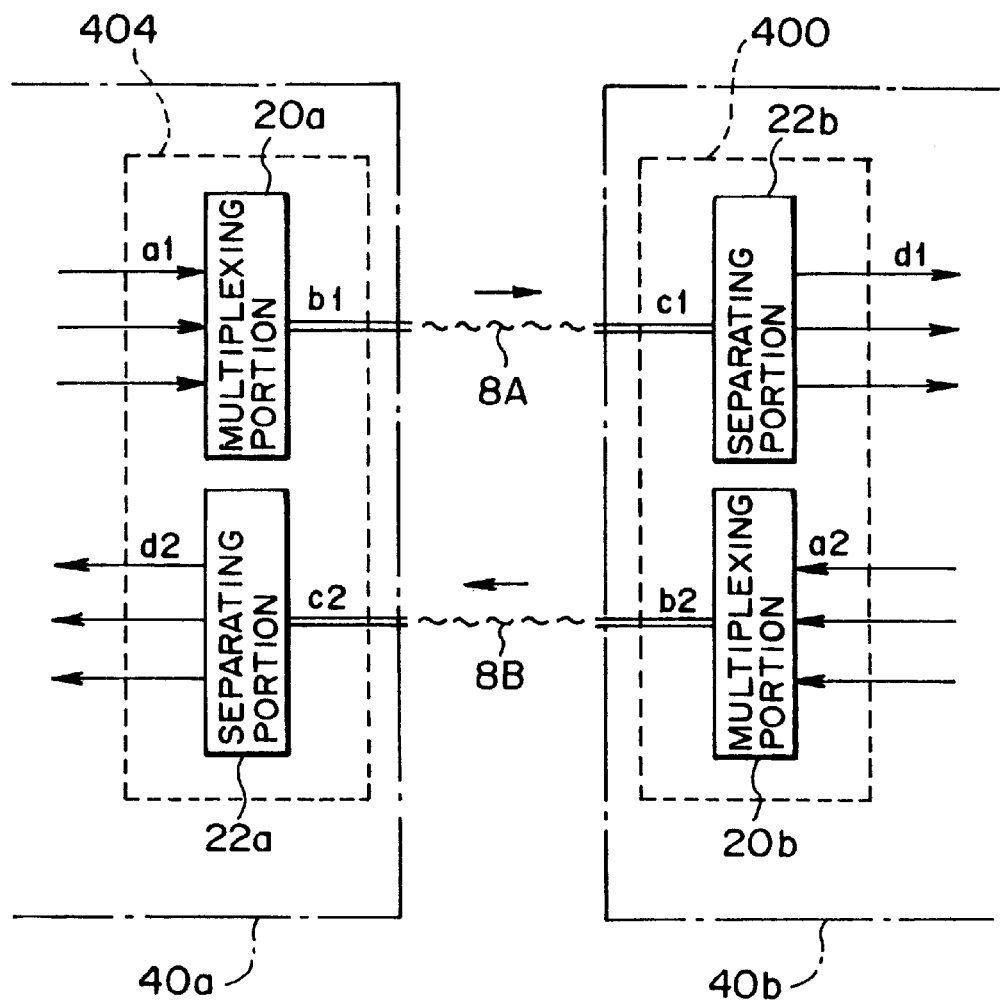
FIG. 8 is a diagram for explaining directions in which information is transmitted between stations according to one embodiment of the present invention.

For example, as shown in FIG. 8, in the case of transmission of information from the station 40a to the station 40b, information is output from a multiplexing portion 20a of the upper hierarchy unit (transmission unit 404) in the station 40a, and is received in the station 40b through an inter-office transmission line 8A. Subsequently, the information is separated in a separating portion 22b of the upper hierarchy unit (transmission unit 400) in the station 40b, and is thereafter transmitted to lower hierarchy units.

On the other hand, in the case of transmission of information from the station 40b to the station 40a, information is output from a multiplexing portion 20b of the transmission unit 400 in the station 40b, and is received in the station 40a through an inter-office transmission line 8B. Subsequently, the information is separated in a separating portion 22a of the transmission unit 404 in the station 40a, and is thereafter transmitted to lower hierarchy units.

That is, it is possible to bidirectionally transmit the effect information spreading in response to the cause information occurring in the stations 40a to 40n. Though the description has been given of the relationship between the station 40a and the station 40b, it will be appreciated that the same holds true for interconnections of the remaining stations 40b to 40n.

In (the transmission unit 404 in) the station 40a shown in FIG. 8, reference numeral "a1" denotes failure information detected before processing in the multiplexing portion 20a, "b1" is failure information detected in the multiplexing portion 20a, "c2" is failure information detected before processing in the separating portion 22a, and "d2" is failure information detected by the separating portion 22a. Further, in (the transmission unit 400 in) the station 40b, reference numeral "a2" designates failure information detected before processing in the multiplexing portion 20b, "b2" is failure information detected by the multiplexing portion 20b, "c1" is failure information detected before processing in the separating portion 22b, and "d1" is failure information detected in the separating portion 22b.

For example, as shown in FIGS. 9(a) to 9(d), the cause information occurring in the stations 40a, 40b shown in FIG. 8 causes effect information to spread to the corresponding stations 40b, 40a according to positions at which the cause information occurs. In the following discussion, symbol "●" shows the position at which the cause information occurs, and symbol "○" is a position at which effect information is developed in response to the cause information.

Figure 9A:
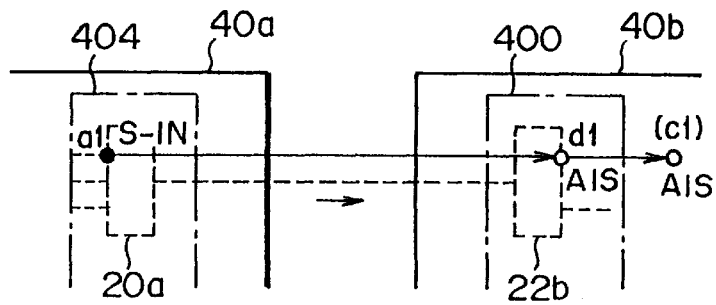
FIGS. 9($a$) to 9($d$) are diagrams for respectively explaining a position at which cause information occurs and positions to which effect information spreads according to one embodiment of the present invention.

For example, FIG. 9(a) shows a position to which the effect information spreads in response to the cause information occurring (at the position shown by reference numeral "a1") before the processing in the multiplexing portion 20a. The detected cause information includes interruption of signal from a lower hierarchy, an error of synchronization, a signal error, or the like. The effect information in response to the cause information spreads (to a position shown by reference numeral "d1") after the processing in the separating portion 22b of the remote station 40b.

In addition, the effect information similarly spreads to a position [see reference numeral "c1" in FIG. 9(a)] before processing in a separating portion (not shown) in the subsequent transmission unit (the transmission unit 401 serving as a medium hierarchy unit). The cause information detected at the position shown by reference numeral "a1" has the information type "S-IN (or T-IN)", and the effect information in response thereto has the information type "AIS".

Figure 9B:
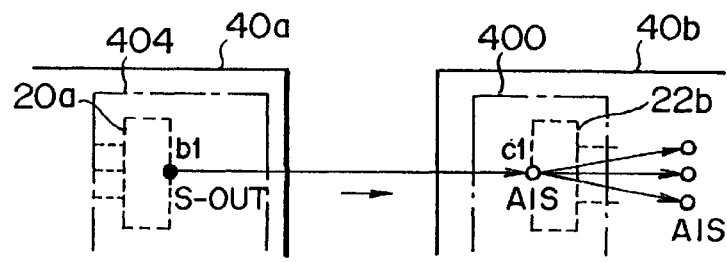

FIG. 9(b) shows positions to which effect information spreads in response to cause information occurring (at the position shown by reference numeral "b1") in the multiplexing portion 20a. Specifically, the cause information shows that a failure occurs in the multiplexing portion 20a.

Further, the effect information in response to the cause information spreads to the position (shown by reference numeral "c1") before the processing in the separating portion 22b of the remote station 40b, subsequently spreading to the positions given by separation in the separating portion 22b. In this case, the cause information detected at the position shown by reference numeral "b1" has the information type "S-OUT (or T-OUT)", and the effect information in response thereto has the information type "AIS".

A failure may occur in the whole transmission unit 404 instead of the failure in the multiplexing portion 20a. In such a case, the transmission unit 404 can not transmit the information type used for identification. Consequently, it does not become apparent that the failure occurs in the transmission unit 404 until effect information in response to cause information reaches the remote station 40b.

Figure 9C:
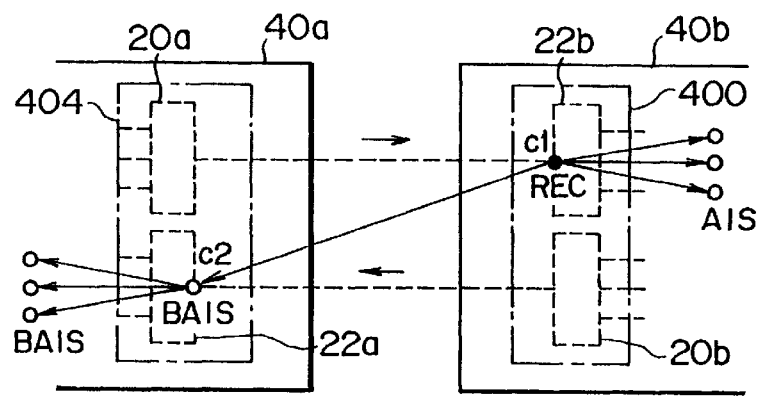
Figure 9D:
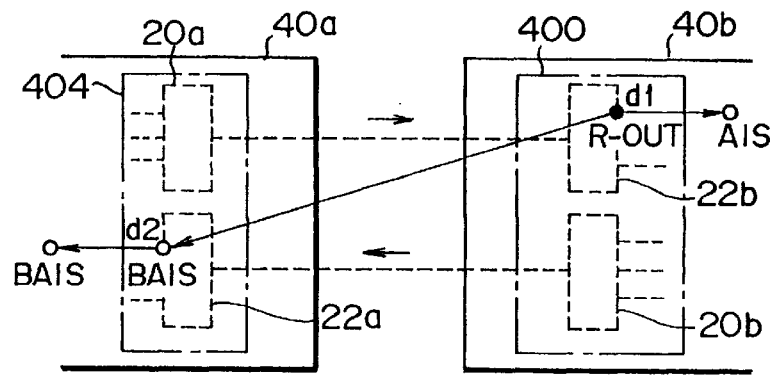

Further, FIG. 9(c) shows positions to which the effect information spreads in response to the cause information occurring (at the position shown by reference numeral "c1") before the processing in the separating portion 22b. Specifically, the cause information includes interruption of information (signal) from the remote station 40a, an error of synchronization, a signal error, or the like. The effect information in response to the cause information spreads to the positions given by separation in the separating portion 22b. Moreover, the cause information detected at the position shown by reference numeral "c1" has the information type "REC", and the effect information spreading in the local station has the information type "AIS".

In this case, additional effect information (with the information type "BAIS") is sent to (the position shown by reference numeral "c2" of) the separating portion 22a of the remote station 40a. The effect information further spreads to the positions given by separation in the separating portion 22a. That is, since the cause information occurs before the separation, the effect information in response thereto spreads to the same hierarchy as that of the cause information (that is, at a level before the separation).

Finally, FIG. 9(b) shows position to which effect information spreads in response to cause information occurring (at the position shown by reference numeral "d1") in the separating portion 22b. Specifically, the cause information shows that a failure occurs in the separating portion 22b. Then, effect information in response to the cause information spreads to the subsequent unit 401 (not shown), and further spreads to positions given by the separation in the separating portion 22a of the remote station 40a.

That is, since the cause information occurs after the separation, the effect information in response thereto spreads to the same hierarchy as that of the cause information (that is, at a level after the separation). Moreover, the cause information detected at the position shown by reference numeral "d1" has the information type "R-OUT", the effect information spreading in the local station has the information type "AIS", and the effect information spreading to the separating portion 22a of the remote station 40a has the information type "BAIS".

As stated above, the data (shown by symbol "●"; see the information types S-IN, S-OUT, REC, and R-OUT) for identification of the position at which the cause information occurs and the data (shown by symbol "○"; see the information types AIS, and BAIS) for identification of the direction in which the effect information spreads are correlated with each other, and are stored in the information storage portion 62. Thus, even when pieces of cause information are detected in the single unit, the actual effect information determination supporting unit 2 can easily retrieve the positions to which the effect information spreads in response to the cause information. That is, it is possible to determine the direction in which the effect information spreads depending upon the position at which a cause failure is detected.

Referring to FIGS. 9, the description has been given of the effect information spreading between the two remote stations 40a and 40b, that is, between the most significant hierarchy units (the transmission unit 404 of the station 40a and the transmission unit 400 of the station 40b). However, specifically, in the stations 40a to 40n, when cause information occurs in one hierarchy of the remote station, effect information in response to the cause information spreads to a unit of the local station in the same hierarchy as that of the cause information.

Figure 10:
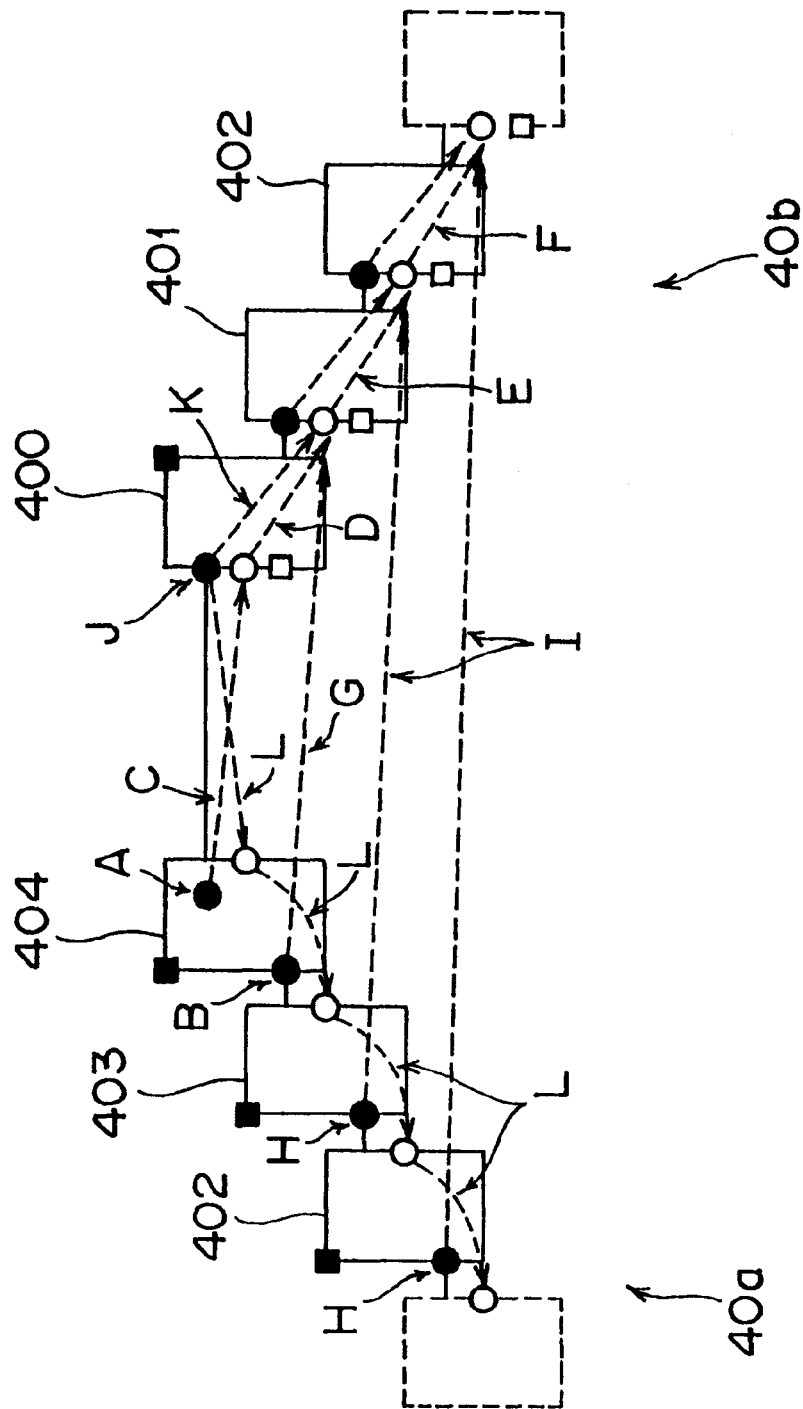
FIG. 10 is a diagram for explaining positions to which effect information spreading in response to cause information is transmitted according to one embodiment of the present invention.

FIG. 10 is a diagram for explaining positions to which the effect information spreading in response to the cause information is transmitted. FIG. 10 shows the effect information spreading from the station 40a to the station 40b (in one direction). In the drawing, symbol "●" denotes a position at which the cause information occurs, "○" is a position at which the effect information is developed, "■" is a position at which essential information (such as power source information, and clock information) occurs, and "□" is a position at which single information (such as information due to an unclear cause) occurs.

Specifically, as shown in FIG. 10, when cause information occurs in the transmission unit 404 (in particular, a sending end) of the station 40a [see FIG. 9(b) and the arrow A in FIG. 10], effect information spreads in response to the cause information to the transmission unit 400 of the station 40b in the same hierarchy as that of the cause information (see the arrow C in FIG. 10), subsequently spreading to the stations 401, 402, . . . of the station 40b (see the arrows D, E, and F in FIG. 10).

Alternatively, when cause information occurs in a connection between the transmission unit 404 of the station 40a and a lower hierarchy unit (transmission unit 403) [see FIG. 9(a) and the arrow B in FIG. 10], effect information spreads to the transmission unit 401 (see the arrow G in FIG. 10), subsequently spreading to the transmission unit 402 and later units (see the arrows E, F in FIG. 10). That is, in this case, since the cause information occurs before multiplexing in the transmission unit 404 [see FIG. 9(a)], the effect information spreads to an output terminal of the transmission unit 400 of the station 40b (i.e., an input terminal of the transmission unit 401).

Similarly, when cause information (see the arrows H in FIG. 10) occurs in a connection between any one of the transmission units 403, 402 . . . of the station 40a and the transmission unit in a lower hierarchy, the cause information spreads to a transmission unit of the remote station 40b in a hierarchy immediately below the hierarchy of the transmission unit having the cause information (see the arrows I in FIG. 10).

Further, when cause information occurs at a receiving end of the local station 40b [see FIG. 9(c) and the arrow J in FIG. 10], effect information in response thereto spreads to units (the transmission stations 401, 402, . . . ) in hierarchies lower than that of the transmission unit 400 (see the arrows K, E, and F in FIG. 10) at which the cause information occurs. Concurrently, the effect information also spreads to the remote station 40a (see the arrows L in FIG. 10).

As described above, when the cause information is detected in any one of the transmission units 400 to 404, the effect information spreads to the transmission units in the hierarchies lower than the hierarchy of the transmission unit at which the cause information is detected. In some configurations of the network 100, the effect information can also spread to the unit of the remote station in the same hierarchy as that of the transmission unit having the cause information. In FIG. 10, though the detailed description has been given of the one-way transmission from the station 40a to the station 40b, it is to be noted that the transmission can reversely be made from the station 40b to the station 40a.

Figure 11:
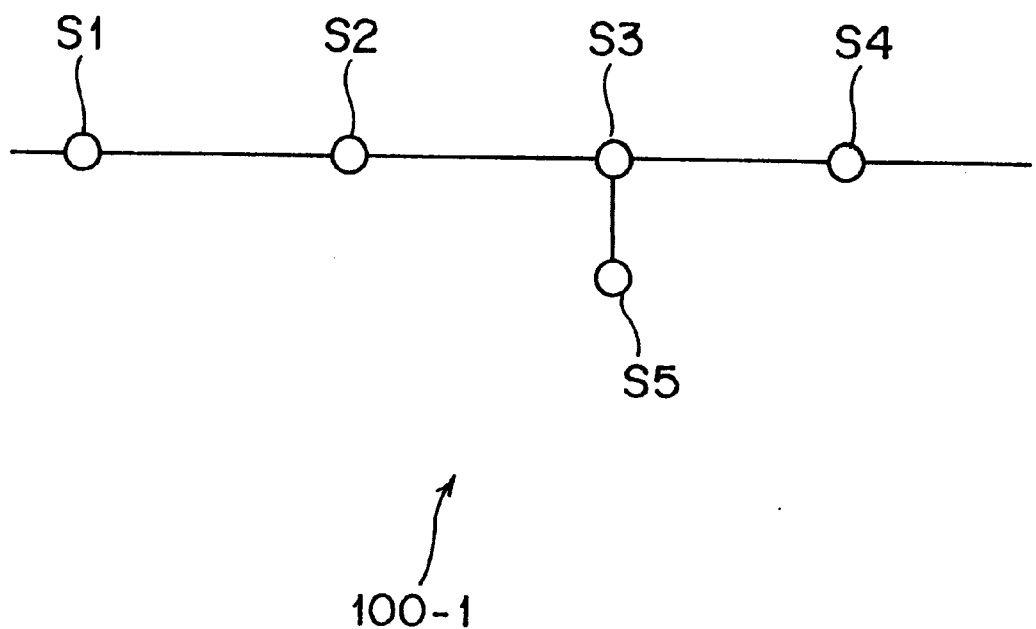
FIG. 11 is a diagram showing one illustrative network configuration according to one embodiment of the present invention.

Hierarchical data for mutually correlating components of the network having a multiple hierarchical configuration is stored in the unit/information hierarchical table (storage portion) 63 shown in FIG. 1. The hierarchical data allows a cause component (such as cause station or cause transmission unit) causing the cause information to exert an effect on only components (such as stations or transmission units) positioned in hierarchies identical with or lower than that of the cause component. Specifically, in the hierarchical data, the components are correlated with each other depending upon the hierarchical configuration of the network 100, thereby showing on which station of the stations 40a to 40n and on which unit of the transmission units 400 to 404 the occurring cause information exerts the effect. For example, as shown in FIG. 11, a network 100-1 may include stations S1, S2, S3, and S4 connected in a linear configuration with the station 53 having a branch to a station S5. In the network 100-1, a cause failure may be detected before the processing in the multiplexing portion 20 (see reference numeral "a" in FIG. 4), or after the processing in the multiplexing portion 20 and the processing in the sending portion 21 (see reference numeral "b" in FIG. 4). In this case, a transmission unit 404 installed in the station S2 (see reference numeral A2 in FIG. 3) transmits effect information to the next station S3, and further transmits the effect information to the station S4 and the station S5 connected to the station S3. In FIG. 11, the station S5 is an end station, and the remaining stations S1 to S4 are relay stations (also serving as end stations).

A description will now be given of illustrative hierarchical data structures according to the network 100-1 shown in FIG. 11 with reference to FIGS. 12(a) to 12(e). FIGS. 12(a) to 12(d) shows hierarchical data when information is transmitted from the station S1 to the station S2, and FIG. 12(e) shows hierarchical data when information is transmitted from the station S2 to the station S1.

Figure 12A:
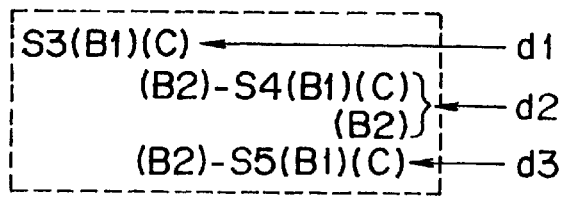
FIGS. 12($a$) to 12($e$) are diagrams respectively showing illustrative hierarchical data created according to the network shown in FIG. 11.

FIG. 12(a) shows hierarchical data describing a position to which effect information spreads in response to cause information occurring in the multiplexing portion 20 of an A2 level transmission unit (see the transmission unit 404 in FIG. 3) of the station S2 (i.e., the cause information detected at a position shown by reference numeral "a" in FIG. 4).

Specifically, the contents of the hierarchical data shown in FIG. 12(a) are as follows: when the cause information occurs in the A2 level multiplexing portion 20, the effect information spreads in response to the cause information to the B1 level transmission unit (see the transmission unit 401) and the C level transmission unit (see the transmission unit 402) of the next station S3 [see the arrow d1 in FIG. 12(a)]. Further, the effect information spreads to the B2 level transmission unit (see the transmission unit 403) at the same level as the B1 level of the station S3, and to the B1 level, C level, and B2 level transmission units of the next station S4 [see the arrow d2 in FIG. 12(a)]. The effect information concurrently spreads to the B1 level and C level transmission units of the station S5 serving as the end station through the B2 level transmission unit of the station S3 [see the arrow d3 in FIG. 12(a)].

Figure 12B:
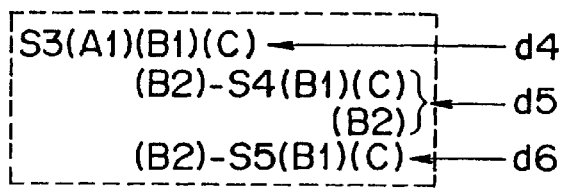

Further, FIG. 12(b) shows hierarchical data describing a position to which effect information spreads in response to cause information occurring in the sending portion 21 of the A2 level transmission unit of the station S2 (i.e., the cause information detected at a position shown by reference numeral "b" in FIG. 4).

Specifically, the contents of the hierarchical data shown in FIG. 12(b) are as follows: when the cause information occurs in the A2 level sending portion 21, the effect information spreads in response to the cause information to the A1, B1, and C level transmission units of the next station S3 [see the arrow d4 in FIG. 12(b)]. Subsequently, the effect information spreads to the B2 level transmission unit at the same level as the B1 level of the station S3, and to the B1 level, C level, and B2 level transmission units of the next station S4 [see the arrow d5 in FIG. 12(b)]. The effect information concurrently spreads to the B1 level and C level transmission units of the station S5 serving as the end station through the B2 level transmission unit of the station S3 [see the arrow d6 in FIG. 12(b)].

That is, the hierarchical data shown in FIGS. 12(a), 12(b) describe the position to which the effect information spreads in response to the cause information occurring at a sending end of the A1 level transmission unit of a certain station (the station S2 in the illustration). The position to which the effect information spreads in the transmission unit of the next station (the station S3 in the illustration) depends upon whether the cause information is detected at a position before of after the multiplexing portion 20 of the A1 level transmission unit.

Figure 12C:
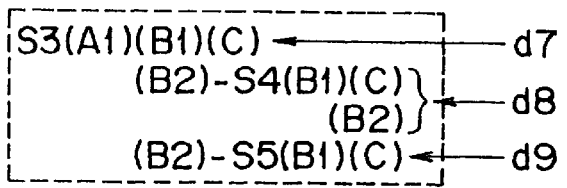

Next, FIG. 12(c) shows hierarchical data describing a position to which effect information spreads in response to cause information occurring in the receiving portion 22 of the A1 level transmission unit (see the transmission unit 400 in FIG. 4) of the station S3 (i.e., the cause information detected at a position shown by reference numeral "c" in FIG. 4).

Specifically, the contents of the hierarchical data shown in FIG. 12(c) are as follows: when the cause information occurs in the A1 level receiving portion 22 of the station S3, the effect information spreads in response to the cause information to the A1, B1, and C level transmission units of the local station [see the arrow d7 in FIG. 12(c)]. As in the above discussion, the effect information also spreads to the B2 level transmission unit of the local station, and to the B1 level, C level, and B2 level transmission units of the next station S4 [see the arrow d8 in FIG. 12(c)]. The effect information concurrently spreads to the B1 level and C level transmission units of the station S5 through the B2 level transmission unit of the local station [see the arrow d9 in FIG. 12(c)].

Figure 12D:
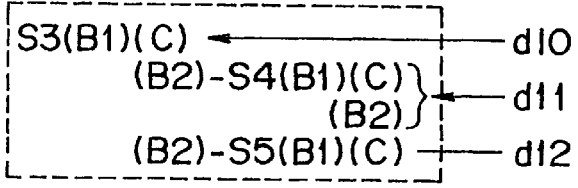
Figure 12E:
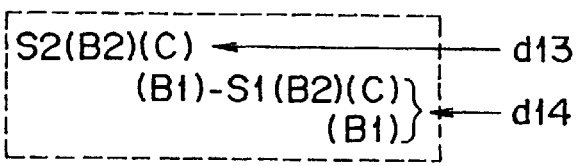

Additionally, FIG. 12(d) shows hierarchical data describing a position to which effect information spreads in response to cause information occurring in the separating portion 22 of the A1 level transmission unit of the station S3 (i.e., the cause information detected at a position shown by reference numeral "d" in FIG. 4).

Specifically, the contents of the hierarchical data shown in FIG. 12(d) are as follows: when the cause information occurs in the A1 level separating portion 22 of the station S3, the effect information spreads in response to the cause information to the B1 and C level transmission units of the local station [see the arrow d10 in FIG. 12(d)]. As in the above discussion, the effect information spreads to the B2 level transmission unit of the local station, and to the B1 level, C level, and B2 level transmission units of the next station S4 [see the arrow d11 in FIG. 12 (d)]. The effect information concurrently spreads to the B1 level and C level transmission units of the station S5 through the B2 level transmission unit of the local station [see the arrow d12 in FIG. 12(d)].

That is, the hierarchical data shown in FIGS. 12 (c), 12(d) describe the position to which the effect information spreads in response to the cause in formation occurring at a receiving end of the A1 level transmission unit of the local station (the station S3 in the illustration). The position to which the effect information spreads in the local station depends upon whether the cause information is detected at a position before or after the separating portion 22 of the A1 level transmission unit.

As stated above, when the cause information occurs in the station S3, the effect information further spreads to the station S2 in response to the cause information.

Specifically, the contents of the hierarchical data shown in FIG. 12 (e) are as follows: when the cause information occurs in the A1 level separating portion 22 of the station S3, the effect information spreads in response to the cause information to the B2 and C level transmission units of the station S2 [see the arrow d13 in FIG. 12(e)]. Further, the effect information spreads to the B1 level transmission unit at the same level as the B2 level of the station S2, and to the B2 level, C level, and B1 level transmission units of the next station S1 [see the arrow d14 in FIG. 12(e)].

Figure 13A:
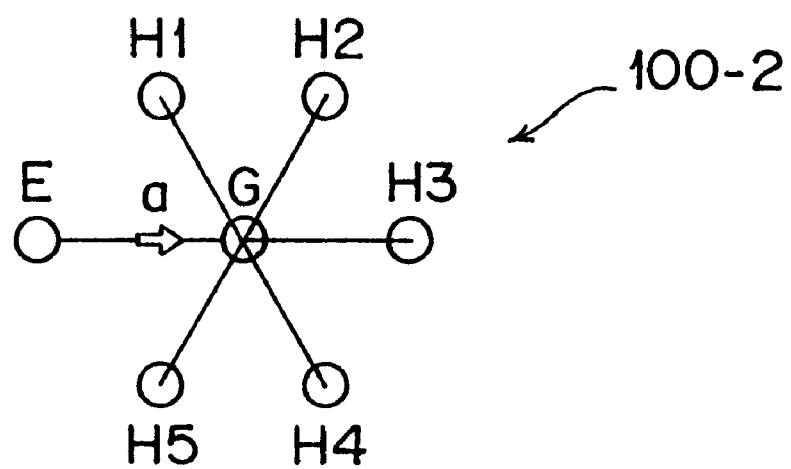
FIGS. 13($a$) and 13($b$) are diagrams showing other illustrative network configurations according to one embodiment of the present invention.
Figure 13B:
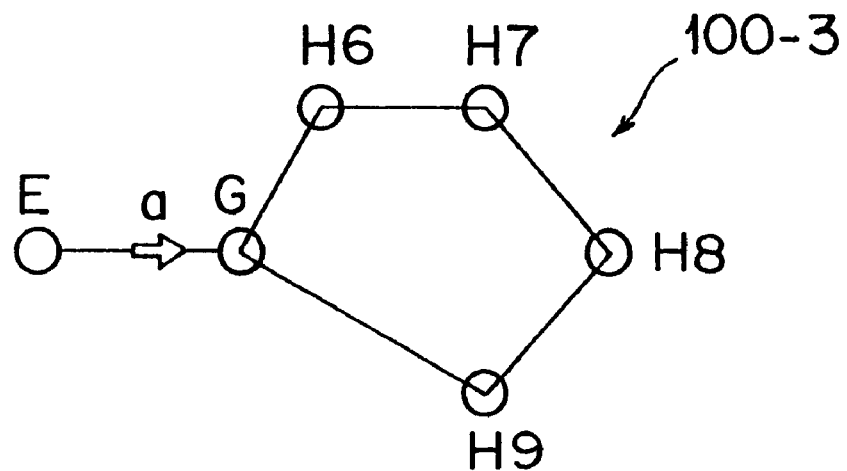

Alternatively, it is also possible to provide a network 100-2 having a station E, and stations H1 to H5 connected in a star with a station G as a center as shown in FIG. 13(a), or a network 100-3 having a station G, and stations H6 to H9 connected in a loop form as shown in FIG. 13(b). In either case, when a cause failure occurs on the route extending from the station E to the station G [see the arrows a in FIGS. 13(a), 13(b)], the cause failure (cause information) is detected in the station G, and effect information spreads in response to the cause information to either the stations H1 to H5 or the stations H6 to H9.

Figure 14A:
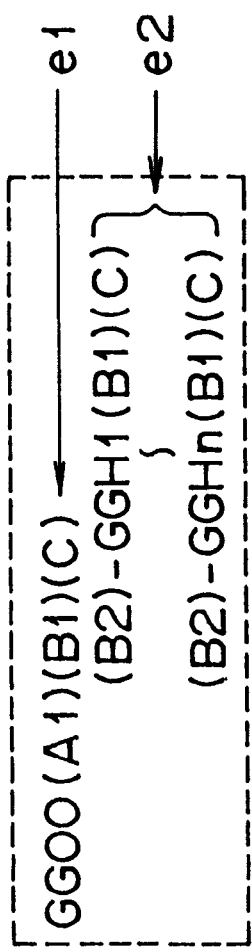
FIGS. 14($a$) to 14($c$) are diagrams showing illustrative hierarchical data created according to the network shown in FIG. 13.

Specifically, in the networks 100-2, 100-3 shown in FIGS. 13(a), 13(b), hierarchical data has a structure as shown in FIG. 14(a). In the hierarchical data shown in FIG. 14(a), the station E is defined as EE00, the station G is GG00, and the stations H1 to Hn under the supervision of the station G are GGH1 to GGHn.

The contents of the hierarchical data shown in FIG. 14(a) are as follows: when the cause information occurs on the route extending from the station E to the station G, the effect information spreads in response to the cause information to the A1, B1, and C level transmission units of the station G [see the arrow e1 in FIG. 14(a)]. Further, the effect information spreads to the B1 level and C level transmission units of the plurality of stations H1 to Hn connected through the B2 level transmission unit of the local station [see the arrow e2 in FIG. 14(a)].

In the network 100-2 as shown in FIG. 13(a), all the stations H1 to H5 under the supervision of the station G are end stations. Hence, all positions to which the effect information spreads may be described by specific codes so as to specify all the transmission units of all the stations H1 to H5 under the supervision of the station G.

In the network 100-3 as shown in FIG. 13(b), all the stations H6 to H9 under the supervision of the station G are connected in the loop form. Hence, all positions to which the effect information spreads may similarly be described by specific codes so as to specify all the transmission units of all the stations H6 to H9 under the supervision of the station G.

Figure 14B:
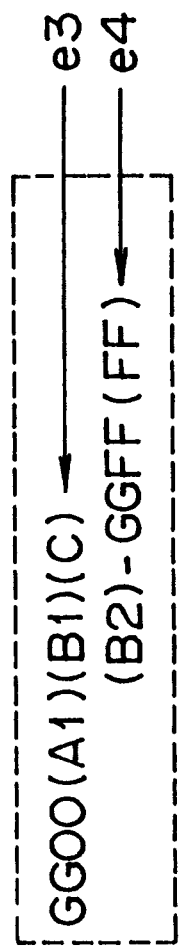

For example, hierarchical data can be described as shown in FIG. 14(b) in which GGFF shows all the stations H1 to Hn (n: natural number) under the supervision of the station G. and FF is levels of all transmission units in hierarchies lower than that of the B level (B1 level, B2 level) transmission unit or a lower level transmission unit of the station G.

That is, the hierarchical data in the networks 100-2, 100-3 shown in FIGS. 13(a), 13(b) show that, when the cause information occurs on the route extending from the station E to the station G, the effect information spreads in response to the cause information to the A1, B1, and C level transmission units of the station G [see the arrow e3 in FIG. 14(b)]. Further, the effect information spreads to all the stations H1 to Hn under the supervision of the local station through the B2 level transmission unit of the local station [see the arrow e4 in FIG. 14(b)].

Figure 14C:

When the effect information spreads to the transmission units at all levels of the station G and all the transmission units of the stations H1 to Hn under the supervision of the station G, hierarchical data has a structure as shown in FIG. 14 (c). The hierarchical data shows that, when the cause information occurs on the route extending from the station E to the station G, the effect information spreads in response to the cause information to the transmission units at all levels of the station G and all the transmission units of the stations H1 to Hn under the supervision thereof.

That is, since it is unnecessary to individually store the stations and the transmission units to which the effect information spreads, the database can be reduced. Moreover, the monitoring unit 3 is used to store the hierarchical data in the unit/information hierarchical table 63.

The station/unit effect data 64 shown in FIG. 1 shows correlations between the stations 40a to 40n receiving the effect information and the transmission units 400 to 404. For example, as shown in FIG. 15, the stored station/unit effect data 64 shows with which transmission unit each of the stations 40a to 40n is correlated in the network 100 (see FIG. 2) (see the database 64A).

Figure 15:
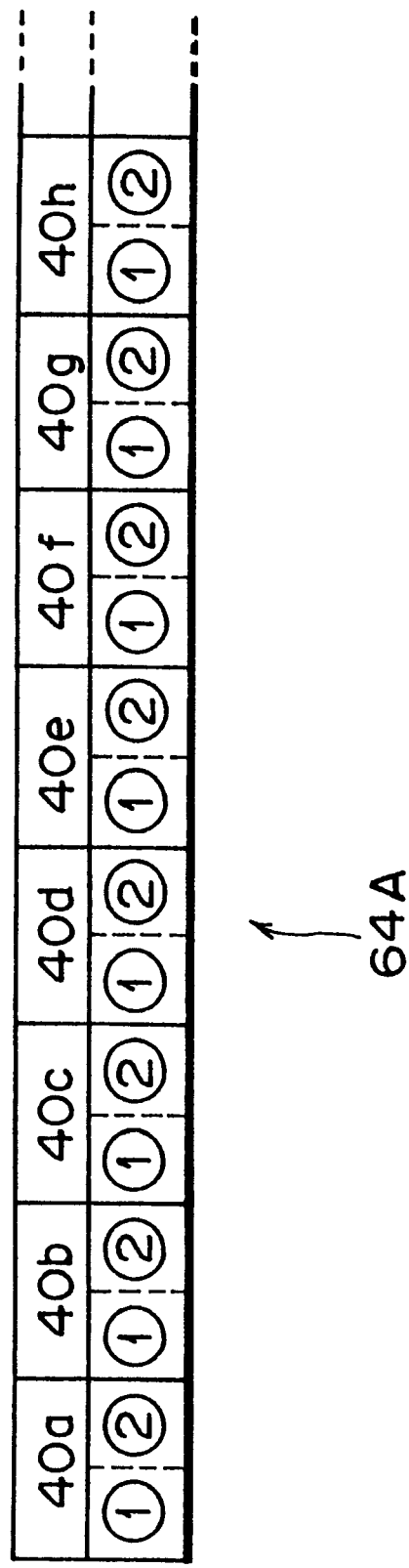
FIG. 15 is a diagram showing one illustrative station/unit effect data stored in a database portion according to one embodiment of the present invention.

Specifically, in the database 64A shown in FIG. 15, the station number (see reference numeral ① in the drawing) and the unit number (see reference numeral ②) are stored in specified areas of the stations 40a to 40n. On the station number area is written the station receiving the effect information according to a configuration (interconnection) of the network 100. On the unit number area is written the number of a transmission unit in which occurrence of an alarm (cause information) can be expected depending upon the effect information. That is, by setting the station number and the unit number in the database 64A, it is possible to correlate positions to which the effect information spreads in response to the cause information according to the configuration of the network 100.

In general, the areas are 4 digits in length, and the contents of written data can be changed according to the configuration of the network 100.

In view of the configuration of the network 100, all the stations 40a to 40n or all the transmission units 400 to 404 may be specified without any problem (i.e., the effect information spreading to all the stations or all the units). Alternatively, it may be decided that a multiple failure never occurs on the network 100 because of a scale of the network 100. In such a case, for example, a specific code "FFFF" (in hexadecimal system) can be set to specify all the stations or all the transmission units as the positions to which the effect information spreads in response to the cause information.

Further, when no effect information spreads from another station to the stations 40b to 40h subsequent to the station 40a, the above specific code may be written (defined) on the station number area of the station 40b provided that the stations 40b to 40h are under the supervision of the station 40a. It is thereby possible to define the station numbers of the stations 40c to 40h and the unit numbers of the transmission units installed for the stations without writing neither of the station numbers nor the unit numbers.

The station/unit effect data 64 can thereby be reduced (simplified). Moreover, the monitoring unit 3 is used for storage of data in the station/unit effect data 64.

In order to simplify the database containing the station/unit effect data 64 described above, there may be created a database in which the specific code is set such that effect information spreads in response to cause information to all the stations 40a to 40n and all the transmission units 400 to 404. Alternatively, there may be created another database in which only information about the stations 40a to 40n are stored with respect to information about a position to which effect information spreads in response to cause information, and no information about the transmission units 400 to 404 are stored. In such a case, occurrence of the multiple failure results in excessively complicated correlations between the information so that an operator can optionally store the data when the multiple failure occurs. Besides, an amount of stored data increases proportional to twice the number of stations unlike the existing database.

As described above, in the database portion 6 is set only the effect information (spreading data) related to the stations 40a to 40n and the transmission units 400 to 404 in the network 100 with respect to line data passing through the position at which the cause information is detected. Thus, it is possible to reduce an amount of information forming the database by three to four digits as compared with the existing database.

Further, by using only the information occurring on the network 100, it is possible to provide information in touch with a real status of the network 100. That is, it is possible to provide reliable consistency of the effect information with the occurring cause information.

Subsequently, the processing portion 7 shown in FIG. 1 retrieves hierarchical data from the unit/information hierarchical table 63 depending upon cause information input into the information input portion 4 (and preprocessed in the preprocessing portion 9). The retrieved hierarchical data is used to extract the effect information input into the information input portion 4 (and preprocessed in the preprocessing portion 9) so as to determine actual effect information which is actually related to the cause information.

Specifically, the processing portion 7 includes an aggregation time zone setting portion 70, an effect direction decision portion 71, a retrieval range determining portion 72, and a determining portion 73.

The aggregation time zone setting portion 70 sets a time zone (see FIG. 7) in which information is aggregated in the information storage portion 62, and retrieves hierarchical data from the unit/information hierarchical table 63 depending upon cause information input into the information input portion 4 in the aggregation time zone. The retrieved hierarchical data is used to extract the effect information input into the information input portion 4 in the aggregation time zone so as to determine the actual effect information.

Further, the effect direction decision portion 71 makes a decision of a direction affected by the cause information and the effect information input into the information input portion 4. Specifically, as described referring to FIG. 9, it is possible to easily make a decision of the direction in which information is transmitted between the stations 40a to 40n, and between the transmission units 400 to 404 depending upon the information type (see reference numerals "S-IN", "S-OUT", "REC", and "R-OUT" in FIG. 9) of a position at which the cause information occurs, and the information type (see reference numerals "AIS", and "BAIS" in FIG. 9) of the effect information spreading in response to the cause information.

Besides, the retrieval range determining portion 72 determines the range of retrieval of the unit/information hierarchical table 63 by referring to the direction obtained by the decision in the effect direction decision portion 71. Specifically, the retrieval range determining portion 72 determines, depending upon a position to which information is transmitted according to the result of decision, the range of retrieval (hierarchical data) among from different types of hierarchical data (see FIGS. 12 and 14) stored in the unit/information hierarchical table 63.

In addition, the determining portion 73 retrieves hierarchical data from the unit/information hierarchical table 63 in the range of retrieval determined in the retrieval range determining portion 72 depending upon the input cause information. The retrieved hierarchical data is used to extract the effect information input into the information input portion 4 so as to determine the actual effect information.

That is, since hierarchical data to be retrieved can be determined by the retrieval range determining portion 72 depending upon the direction in which the effect information spreads, obtained by the decision of the effect direction decision portion 71, the determining portion 73 can easily select the actual effect information from among many input effect information.

Meanwhile, the processing portion 7 (CPU) in the actual effect information determination supporting unit 2 (see FIG. 1) reads the actual effect information decision supporting processing program 65 in the database portion 6 to operate according to the program, thereby making the decision of the actual effect information. Further, the actual effect information decision supporting processing program 65 is installed in the actual effect information determination supporting unit 2 through a storage medium such as floppy disk. The actual effect information decision supporting processing program 65 is stored in the database portion 6 via the actual effect information determination supporting unit 2.

Moreover, it is also possible to run the actual effect information decision supporting processing program 65 after directly reading the actual effect information decision supporting processing program 65 from, for example, the floppy disk without installing the program in the actual effect information determination supporting unit 2 through a magnetic disk unit or the like.

Figure 16:
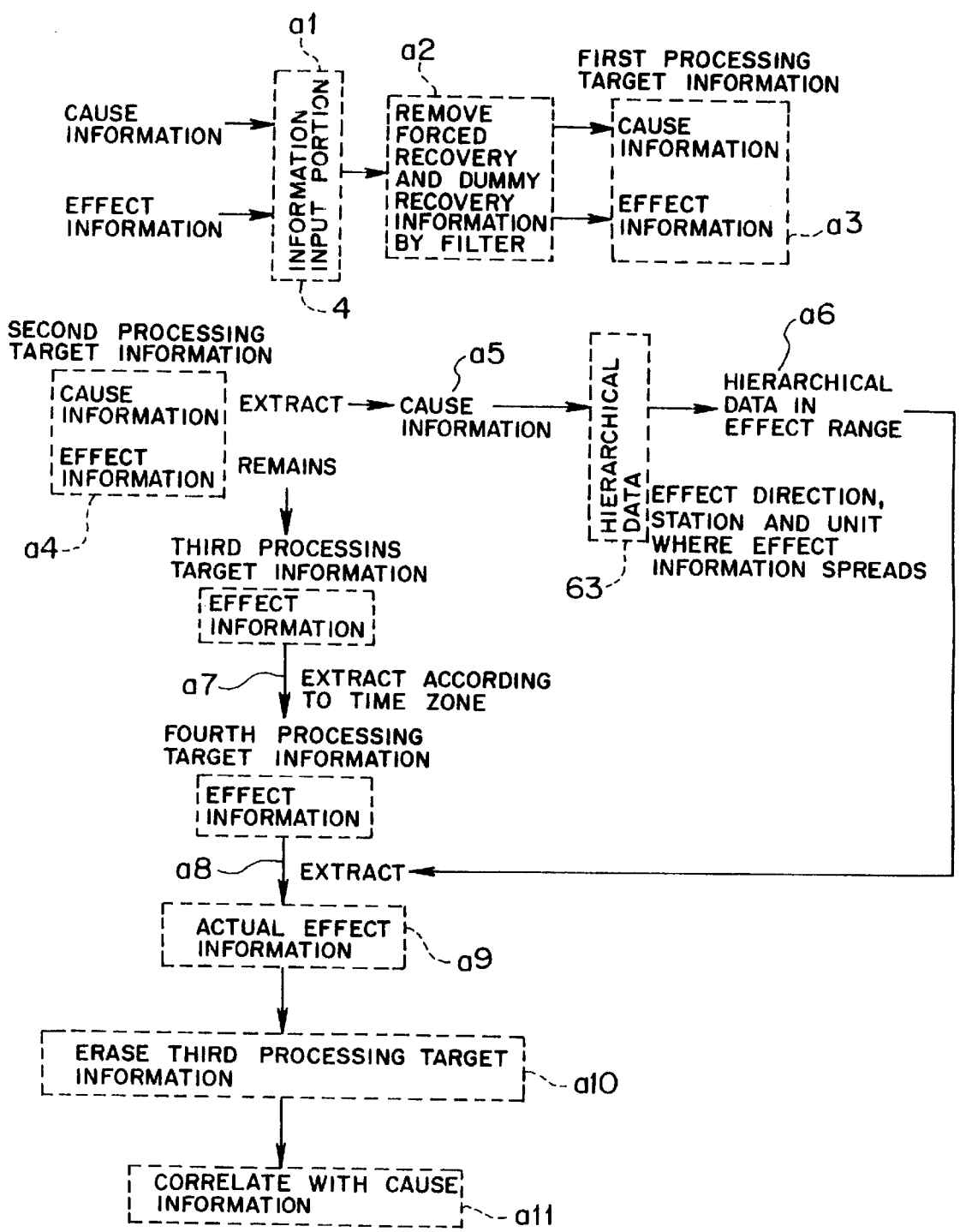
FIG. 16 is a block diagram for explaining actual effect information determination processing according to one embodiment of the present invention.
Figure 17:
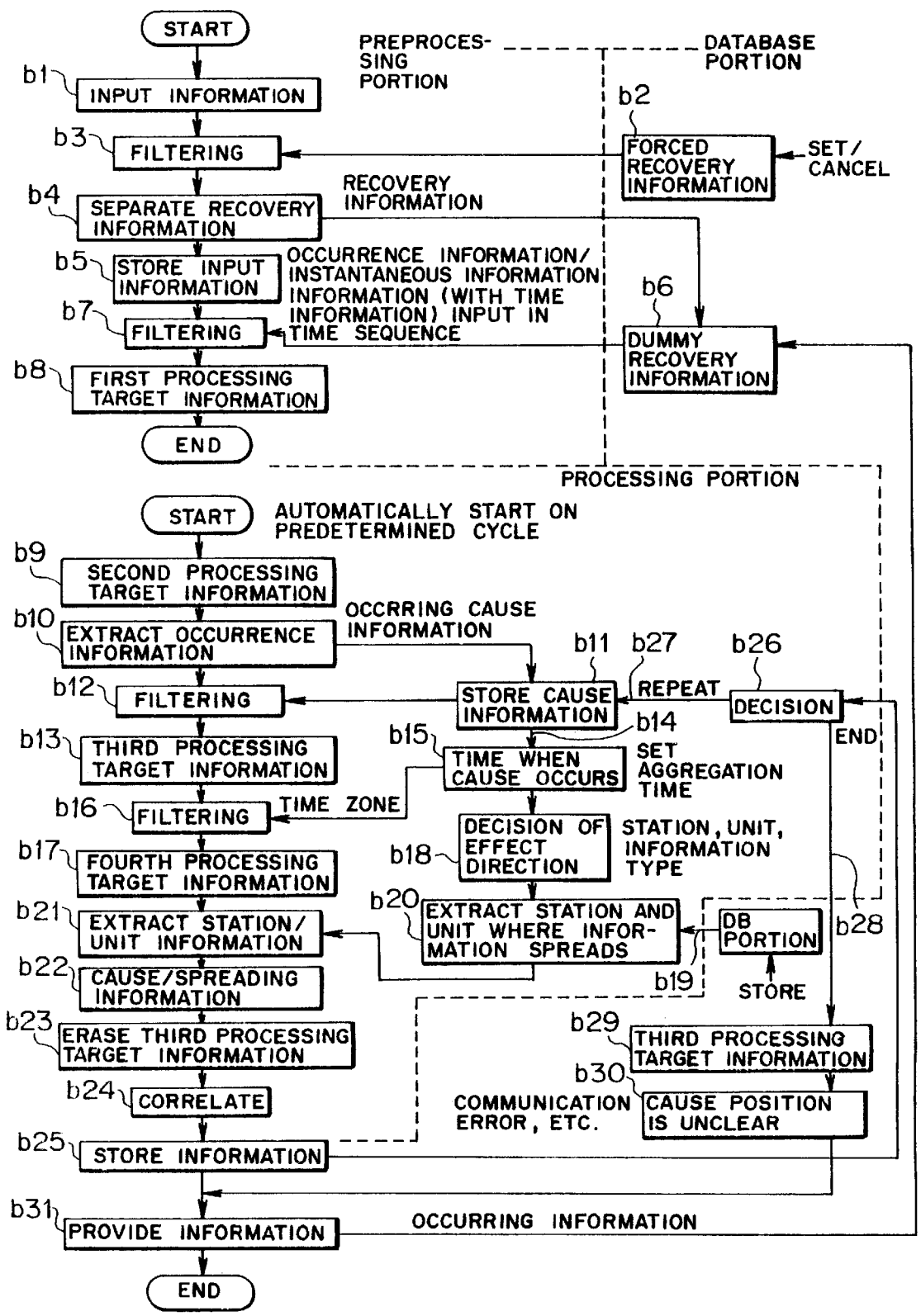
FIG. 17 is a flowchart for explaining the actual effect information determination processing according to one embodiment of the present invention.

A description will now be given of the operation of the actual effect information determination supporting system 80 having the above configuration, according to one embodiment of the present invention with reference to FIGS. 16 and 17.

In the actual effect information determination supporting unit 2, before starting the actual effect information determination supporting system 80, hierarchical data is previously stored in the unit/information hierarchical table 63. Cause information is collected in relation to components of the network 100 having a multiple hierarchical configuration. The hierarchical data mutually correlates the components of the network 100 having the multiple hierarchical configuration such that a cause component causing the cause information exerts an effect on only a component positioned in a hierarchy identical with or lower than that of the cause component (storage step).

Thereafter, when the actual effect information determination supporting system 80 is activated, the cause information and the effect information are input in real time (information input step). At intervals of a predetermined time, the hierarchical data is retrieved from the unit/information hierarchical table 63 depending upon the input cause information. The retrieved hierarchical data is used to extract the input effect information so as to determine the actual effect information actually related to the cause information (processing step).

Specifically, a variation is caused in information (the cause information and the effect information) collected in real time in the information collecting unit 1 installed in the stations 40a to 40n of the network 100. The preprocessing portion 9 causes the information input portion 4 to fetch the information through an information interface (not shown) (Step a1 in FIG. 16). In the preprocessing portion 9, the filter 5 removes information matching the forced recovery information and the dummy recovery information previously stored in the database portion 6 (Step a2), thereby extracting cause information and effect information (referred to as first processing target information) serving as a candidate for processing (Step a3).

Specifically, when the cause information and the effect information are input into the information input portion 4 through the information collecting unit 1 (Step b1 in FIG. 17), in the preprocessing portion 9, while referring to the forced recovery information stored in the forced recovery information storage portion 61 (Step b2), the second filter portion 51 removes the cause information corresponding to the forced recovery information (Step b3).

Subsequently, cause information which has been recovered (recovery information) is separated from the removed information (Step b4), and is stored in the dummy recovery information storage portion 60. On the other hand, the remaining information (such as subsequently occurring information, and instantaneous information) obtained by separating the recovery information is stored in the information storage portion 62 (Step b5). All the remaining information stored in the information storage portion 62 is provided with time information.

In the preprocessing portion 9, the recovery information (see Step b4) is removed from the dummy recovery information stored in the dummy recovery information storage portion 60 to obtain the resultant dummy recovery information (Step b6). The first filter portion 50 removes information matching the obtained dummy recovery information from among the information stored in the information storage portion 62 (Step b7), thereby extracting the cause information and the effect information (the first processing target information) serving as the a candidate for processing (Step b8).

Moreover, the processing for extracting the first processing target information (Steps a1 to a3 in FIG. 16, and Steps b1 to b8 in FIG. 17) is performed in real time. Thus, the subsequently occurring information and the instantaneously occurring information are stored in the information storage portion 62 in the order in which the information occurs.

A description will now be given of processing performed by the processing portion 7 depending upon the first processing target information to determine actual effect information actually related to cause information.

In the processing portion 7, the information storage portion 62 fetches the subsequently occurring information and the instantaneously occurring information (referred to as second processing target information; Step a4 in FIG. 16) stored in the information storage portion 62 as the first processing target information. After the cause information is extracted from the fetched information (Step a5), the effect direction decision portion 71 extracts, depending upon the cause information, hierarchical data related to the position (effect range) to which the effect information spreads from the unit/information hierarchical table 63 to make a decision of a direction in which the effect information spreads (Step a6).

On the other hand, the processing portion 7 extracts fourth processing target information from third processing target information (Step a7). The third processing target information is the remaining information obtained by extracting the cause information from the second processing target information, that is, the pieces of effect information containing the actual effect information. The fourth processing target information is information in the aggregation time zone (see reference numeral T in FIG. 7) set by the aggregation time zone setting portion 70 with respect to the time of occurrence of the cause information.

Further, the effect information having the spreading direction of which a decision has been made is extracted from the fourth processing target information (the effect information in the aggregation time zone) (Step a8). The determining portion 73 determines the actual effect information actually related to the cause information (Step a9). Subsequently, the processing portion 7 erases the third processing target information (the effect information containing the actual effect information) (Step a10), thereby correlating the actual effect information with the cause information (Step a11).

A detailed description will now be given of the processing performed on a predetermined cycle to determine the actual effect information. First, the processing portion 7 selects the information serving as a candidate for processing (the second processing target information) from among the information (the subsequently occurring information and the instantaneously occurring information; the first processing target information) obtained by the dummy recovery processing and the forced recovery processing. The processing portion 7 removes the contents of the selected information from the information storage portion 62 (Step b9 in FIG. 17). That is, the processing portion 7 is placed in a state to store in the information storage portion 62 the first processing target information subsequently occurring during processing of the selected information.

Thereafter, the processing portion 7 extracts the occurring cause information from the second processing target information (Step b10), and stores the information in the information storage portion 62 (Step b11). The extracted cause information is used to select the effect information from among the second processing target information (Step b12). The processing portion 7 stores the selected effect information (the pieces of effect information containing the actual effect information; the third processing target information) in the information storage portion 62 (Step b13).

Then, the processing portion 7 fetches one cause information from the occurring cause information stored in the information storage portion 62 (Step b14), and detects a time of occurrence (see reference numeral t1 in FIG. 7) of the cause information. The aggregation time zone setting portion 70 sets the aggregation time zone depending upon the time of occurrence (Step b15) The processing portion 7 extracts information in the aggregation time zone from the third processing target information (Step b16), and stores the extracted information in the information storage portion 62 (the fourth processing target information; Step b7).

At the point in time, the occurring cause information fetched from the information storage portion 62 (see Step b14) is removed from the information storage portion 62.

Further, the processing portion 7 uses the effect direction decision portion 71 to make a decision of a direction in which the effect information spreads depending upon the cause information used in the aggregation time zone setting portion 70 to set the aggregation time zone (Step b18). Depending upon the result of decision, the retrieval range determining portion 72 selects the range of retrieval of the spreading effect information from the hierarchical data (database; DB) previously stored in the unit/information hierarchical table 63 (Step b19).

The processing portion 7 extracts the station or the unit to which the effect information spreads from the hierarchical data in the determined range of retrieval (Step b20), and temporarily stores the extracted information in the information storage portion 62.

Thereafter, the temporarily stored information about the station or the unit to which the effect information spreads is extracted from among the fourth processing target information (see Step b17) (Step b21). The extracted information is defined as actual effect information (cause/spreading information) actually related to the cause information (Step b22), and is temporarily stored in the information storage portion 62. Then, the defined actual effect information is removed (erased) from the third processing target information (Step b23).

The one cause information (see Step b14) fetched from the information storage portion 62 and the extracted actual effect information (Step b22) are correlated (grouped) (Step b24), and are stored in the information storage portion 62 (Step b25).

Moreover, when no actual effect information can be defined, it is decided that no effect information spreads in response to the cause information, resulting in storing data to this effect in the information storage portion 62 (Step b25).

After the completion of storage of the actual effect information with respect to the one cause information, the processing portion 7 decides whether or not the series of processing should be terminated (Step b26). When the information storage portion 62 holds cause information which is not correlated with actual effect information (see Step b27), the processing portion 7 performs the processing in Steps b14 to b26. That is, the processing is repeated until correlation of all the cause information is completed.

After the completion of repetition of the processing (see Step b28), the processing portion 7 reads the third processing target information (that is, the remaining effect information obtained by removing the actual effect information) (Step b29), and stores the effect information in the information storage portion 62 as information having an unclear cause position such as communication error (Step b30).

That is, since the remaining information can also be stored as the information having the unclear cause position, the remaining effect information is not regarded as an error due to a lack of database information, or storage error. It is thereby possible to sort all events (information) occurring on the network 100 based upon cause positions.

Subsequently, the information storage portion 62 provides the monitoring unit 3 with the contents of information after the correlation processing and the contents of information having the unclear cause position (Step b31). That is, the monitoring unit 3 can identify the provided information as currently occurring information.

That is, the currently occurring information is stored in the dummy recovery information storage portion 60. It is thereby possible to remove the currently occurring information from information subsequently input through the information input portion 4 because the currently occurring information becomes dummy recovery information. The series of processing (Steps b9 to b31) as described above is automatically performed again after a predetermined time period.

As stated above, in the actual effect information determination supporting unit 2 according to the embodiment of the present invention, the actual effect information actually related to the cause information is determined by the input cause information and the input effect information depending upon the hierarchical data (see FIGS. 12 and 14) for correlating the components of the network 100 having the multiple hierarchical configuration. It is thereby possible to rapidly grasp the status of the network 100 operated according to the complex and sophisticated autonomic control function, resulting in an advantage of enhanced performance of the unit.

According to the embodiment, the amount of data is increased proportional to twice the number of units installed in the stations. The amount of data is increased proportional to one data in the illustrative simplified database (1), or proportional to twice the number of stations in the illustrative simplified database (2).

(c) Description of Modification

The embodiment has been described in detail with reference to the stations 40a to 40n and the transmission units 400 to 404 in the one network 100. However, it is to be noted that the network 100 may be monitored by dividing the network 100 for interconnecting the stations 40a to 40n if the network 100 becomes larger.

Figure 18A:
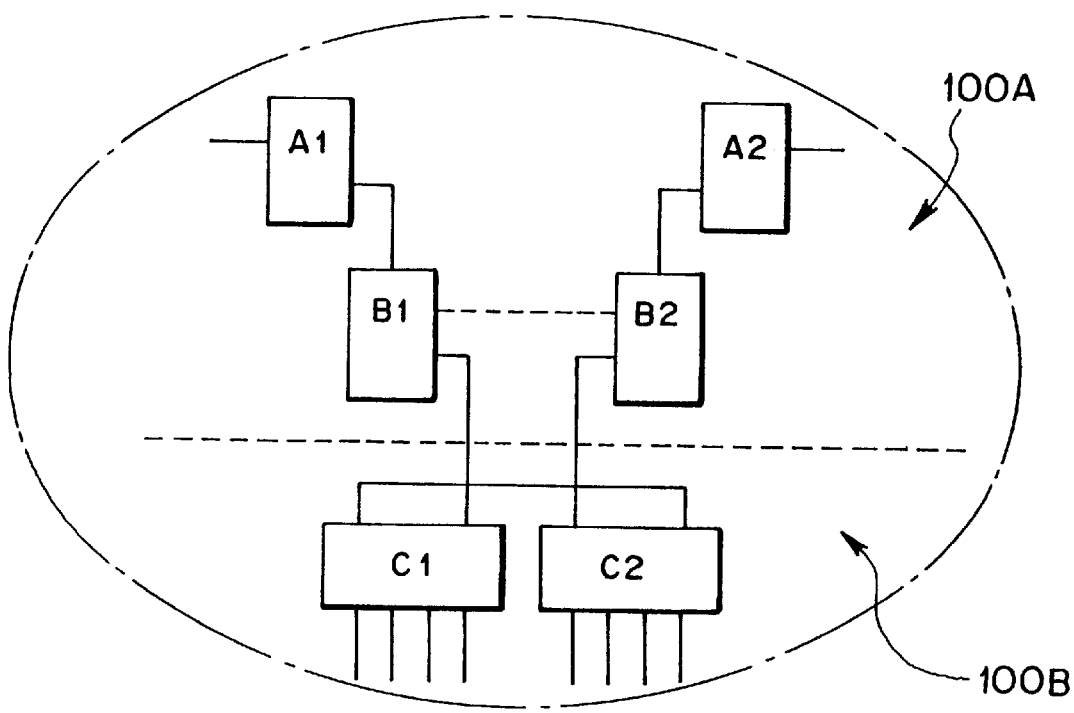
FIGS. 18 ($a$) and 18($b$) are diagrams showing a first modification of the actual effect information determination supporting unit according to the present invention.
Figure 18B:
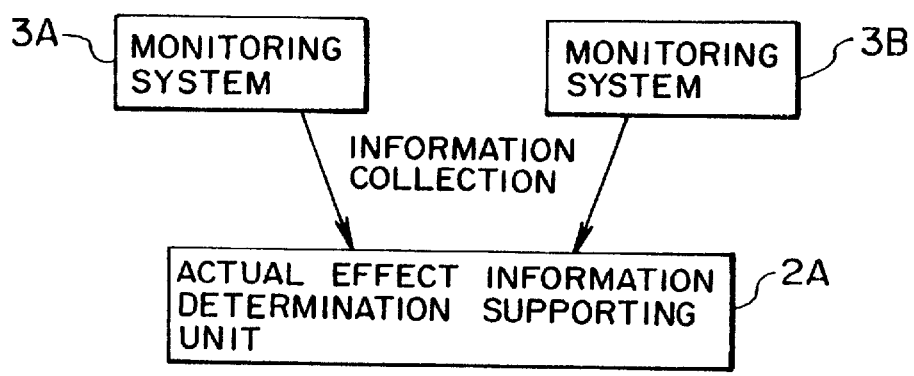

Specifically, as shown in FIG. 18(a), the one network 100 is divided into a relay network 100A and a subscriber network 100B. The networks 100A and 100B are divided and monitored by monitoring systems (monitoring units) 3A, 3B [see FIG. 18(b)].

The monitoring systems 3A, 3B collect information, that is, cause information occurring on the relay network 100A and effect information spreading to the subscriber network 100B. Then, the cause information and the effect information are correlated with each other in an actual effect information determination supporting unit 2A according to the procedure as discussed referring to FIGS. 16 and 17.

Figure 19A:
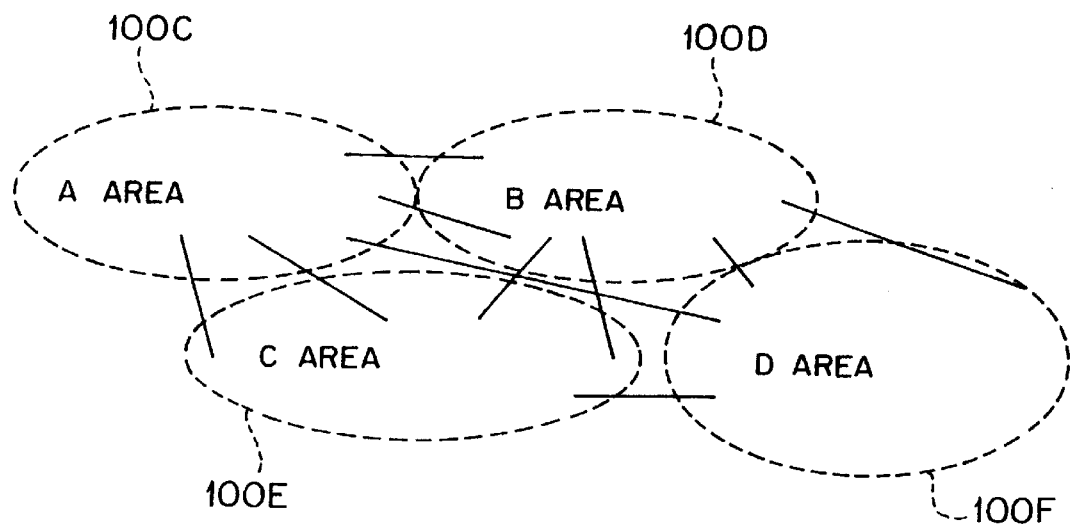
FIGS. 19($a$) and 19($b$) are diagrams showing a second modification of the actual effect information determination supporting unit according to the present invention.
Figure 19B:
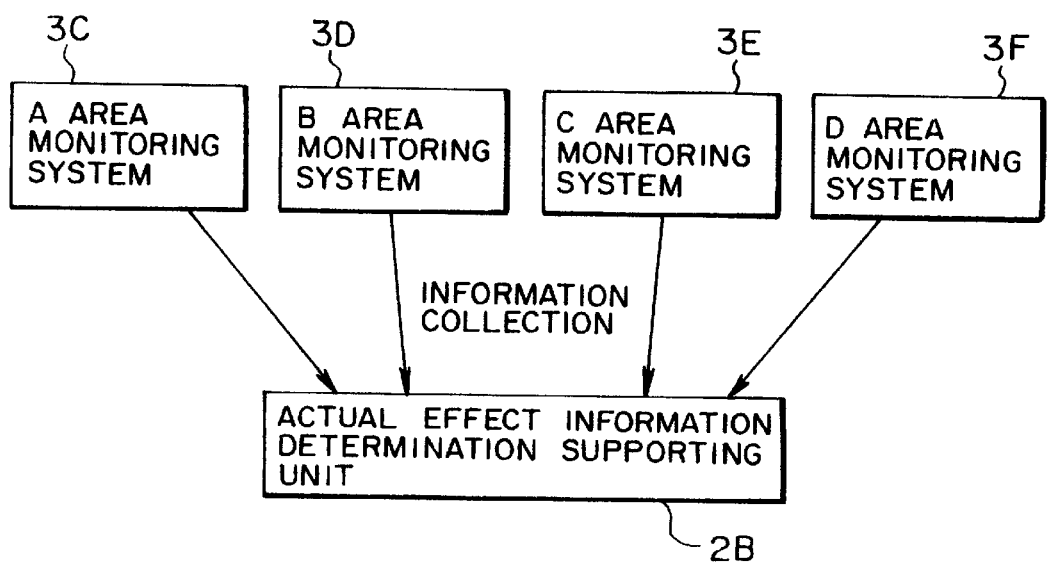

Alternatively, the one network 100 may be divided according to a plurality of areas, and monitoring systems may be installed for the areas. Specifically, as shown in FIG. 19(a), the network 100 is divided into an A area network 100C, a B area network 100D, a C area network 100E, and a D area network 100F. Information services for the areas are monitored by the monitoring systems for the networks, that is, an A area monitoring system 3C, a B area monitoring system 3D, a C area monitoring system 3E, and a D area monitoring system 3F [see FIG. 19(b)].

As the monitoring systems 3C to 3F for information collection become larger, a larger unit 2B is required. In this case, the monitoring systems 3C to 3F previously select a related cause failure to post the result of selection to the unit 2B. The monitoring systems 3C to 3F can correlate the selected cause information with the spreading information detected by the own monitoring systems 3C to 3F. The cause information and the spreading information are correlated with each other according to the same procedure as that discussed referring to FIGS. 16 and 17.

Figure 20A:
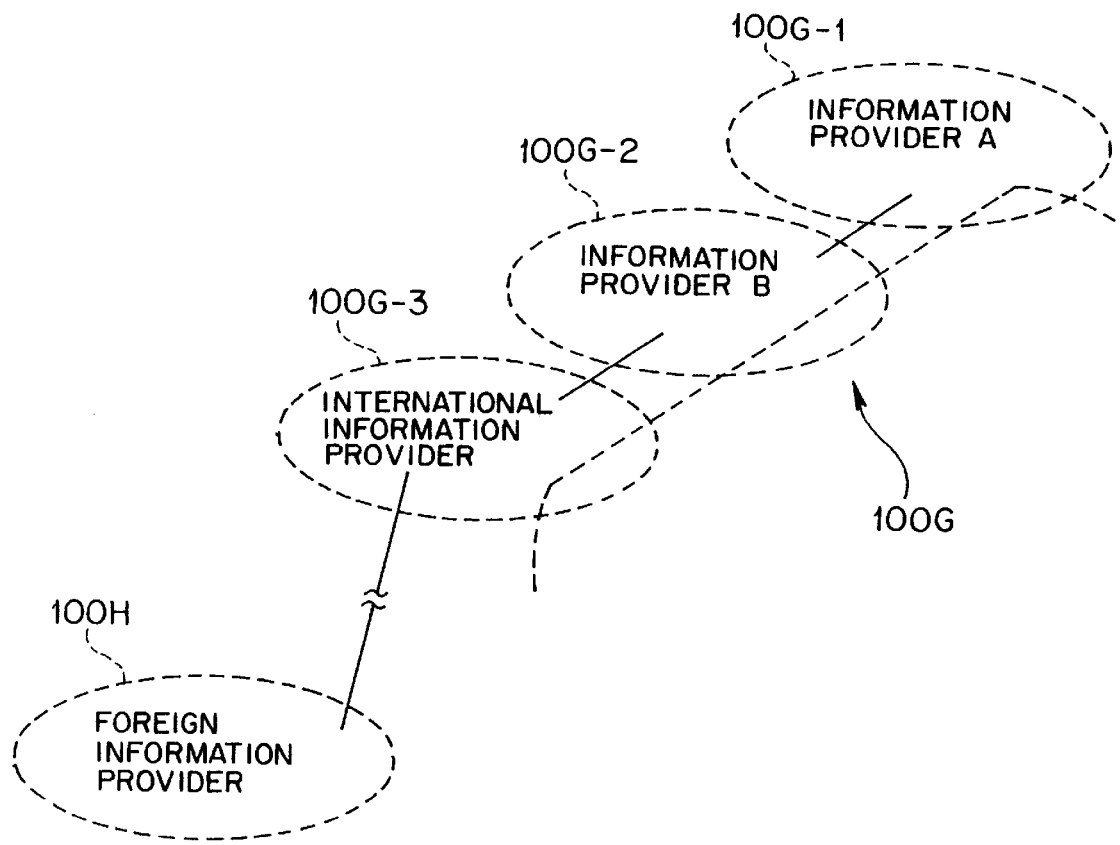
FIGS. 20 ($a$) and 20($b$) are diagrams showing a third modification of the actual effect information determination supporting unit according to the present invention.
Figure 20B:
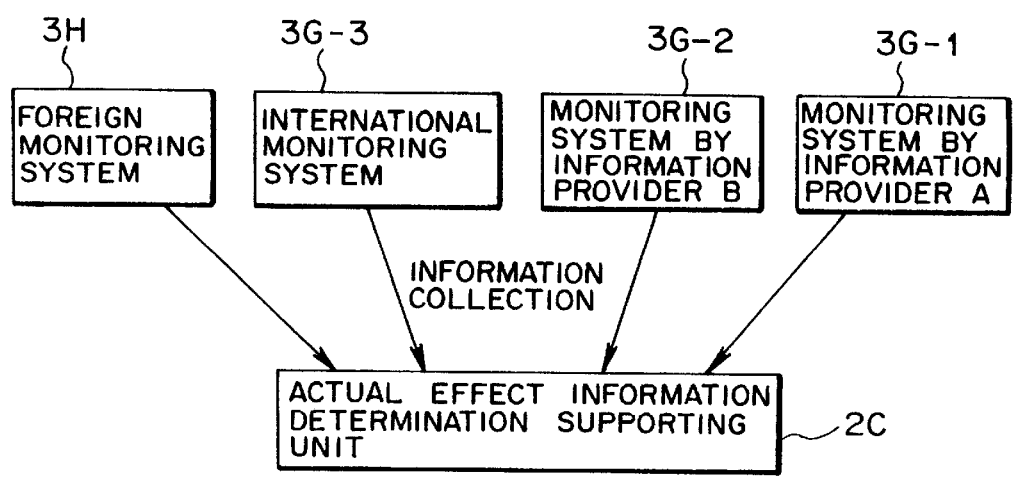

It will be appreciated that the present invention can be applied to collect target information even when the own monitoring system is combined with a foreign monitoring system as well as a monitoring system operated by another information provider. For example, as shown in FIG. 20(a), a domestic network 100G including a network 100G-1 operated by an information provider A, a network 100G-2 by an information provider B, and a network 100G-3 by an international information provider, and a large network including a network 100H by a foreign information provider are respectively provided with monitoring systems 3G-1, 3G-2, 3G-3, and 3H [see FIG. 20(b)]. When the own monitoring systems 3G-1, 3G-2, 3G-3, and 3H receive information showing that a cause failure occurs in the network operated by another information provider, it is possible to correlate the cause information with spreading information detected in the own monitoring systems 3G-1, 3G-2, 3G-3, and 3H according to the same procedure as that discussed referring to FIGS. 16 and 17.

As described above, according to the actual effect information determination supporting units 2A, 2B, and 2C, it is possible to determine the actual effect information in the plurality of networks as in the one network. As a result, there is an advantage in that the range of application of the present invention can be extended.

It is to be understood that the present invention should not be limited to the embodiments, and changes and variations may be made without departing from the spirit or scope of the following claims.

What is claimed is:

1. An apparatus for use with a network having hierarchical configuration of a number of interconnected components, said apparatus being operable to supportively determine a piece of actual effect information, which indicates a component actually affected by a cause component in the number of components, and comprising:

an information input unit for receiving, as inputs, a piece of cause information, which indicates the cause component, and one or more piece of effect information, each of which indicates one of the number of components affected by another one of the number of components, collected from the network;

a storage unit storing hierarchical data which represents the hierarchical configuration in such a manner that if any one of the number of components is the cause component, the cause component is assumed to affect the components positioned in a rank identical with or lower than the rank of the cause component in the hierarchical configuration; and a processing unit for (i) retrieving data of components which are assumed to be affected by the cause component from the hierarchical data in said storage unit based on the piece of cause information inputted by said information input unit, ii extracting a piece of effect information which indicates the components assumed to be affected by the cause component from the pieces of effect information which is inputted by said information input unit based on the retrieved data of the components assumed to be affected by the cause component and (iii) determining the extracted piece of effect information as the piece of actual effect information.

2. An apparatus according to claim 1, further comprising:

a preprocessing unit for preprocessing the piece of cause information and the pieces of effect information inputted by said information input unit so that said processing unit carries out the retrieving, the extracting, and the determining based on preprocessed piece of cause information and the pieces of effect information.

3. An apparatus according to claim 2, wherein said preprocessing unit includes a compulsory-recovery-information storage unit for storing a piece of compulsory recovery information, which indicates a component assumed to affect to no other components in the network even if the component generates a piece of cause information; and a first filter unit for removing the piece of the cause information when the inputted piece of cause information corresponds to the component indicated by the piece of compulsory recovery information.

4. An apparatus for supporting actual effect information determination comprising:

an information input unit for receiving, as inputs, cause information and effect information collected in relation to network-components having a multiple hierarchical configuration;

a storage unit in which hierarchical data for mutually correlating the network-components having the multiple hierarchical configuration in such a manner that a cause component causing the cause information exerts an effect on only a component positioned in a hierarchy identical with or lower than that of the cause component, is previously stored; and a processing unit for retrieving the hierarchical data from said storage unit based on the cause information inputted into said information input unit, extracting the effect information inputted into the information input unit by using the retrieved hierarchical data and determining actual effect information actually related to the cause information based on the extracted effect information;

a preprocessing unit for preprocessing the cause information and the effect information inputted into said information input unit; and said processing unit retrieves the hierarchical data from said storage unit based on the cause information pre-processed in said preprocessing unit, extracts the effect information preprocessed in the preprocessing unit by using the retrieved hierarchical data and determines the actual effect information based on the extracted effect information;

said preprocessing unit includes a dummy recovery information storage unit in which dummy recovery information defined as information in relation to a component continuously causing the cause information is stored; and a second filter unit for removing the dummy recovery information stored in said dummy recovery information storage unit from among the cause information and the effect information inputted into said information input unit.

5. An apparatus for supporting actual effect information determination according to claim 4, further comprising means for, when a state of continuous occurrence of the cause information is recovered, removing the corresponding dummy recovery information from said dummy recovery information storage unit.

6. An apparatus according to claim 1, wherein said processing unit is operable to set a time zone during which said information input unit inputs one or more pieces of cause information and effect information, and carries out the retrieving, the extracting, and the determining based on one or more pieces of cause information and effect information inputted by said information input unit during the time zone.

7. An apparatus according to claim 6, wherein the time zone is set based on a time at which a piece of cause information is detected.

8. An apparatus according to claim 1, wherein said processing unit includes an effect direction decision unit for deciding a direction affected by the cause component based on the piece of cause information and the piece of effect information;

a retrieval range determining unit for determining a retrieval range of hierarchical data stored in said storage unit based on the direction decided by said effect direction decision unit; and a determining unit for carrying out the retrieving, the extracting, and the determining based on the retrieval range.

9. A method for supportively determining, in a network having a hierarchical configuration of a number of interconnected components, a piece of actual effect information which indicates a component actually affected by a cause component in the number of components, said method comprising the steps of:

(a) previously storing hierarchical data, which represents the hierarchical configuration in such a manner that if any one of the number of components is the cause component, the cause component is assumed to affect the components positioned in a rank identical with or lower than the rank of the cause component in the hierarchical configuration;

(b) inputting a piece of cause information, which indicates the cause component, and one or more pieces of effect information, each of which indicates one of the number of components affected by another one of the number of components, collected from the network in real time;

(c) retrieving, at predetermined time intervals, data of components which are assumed to be affected by the cause component from the hierarchical data stored in said step (a) based on the piece of cause information inputted in said step (b);

(d) extracting a piece of effect information which indicates the components assumed to be affected by the cause component from the pieces of effect information inputted in said step (b) based on the data of the components retrieved in said step (c); and (e) determining the pieces of effect information extracted in said step (d) as the piece of actual effect information.

10. A computer-readable recording medium storing a program for use in a computer with (i) a storage unit having a hierarchical data which represents hierarchical configuration of a number of components, which are interconnected to form a network, in such a manner that if any one of the components is a cause component, the cause component is assumed to affect components in a rank identical with or lower than the rank of the cause component in the hierarchical configuration and (ii) an information input unit inputting the computer a piece of cause information, which indicates the cause component, and one or more pieces of effect information, each of which indicates one of the number of components affected by another one of the number of the components, collected from the network, said program supportively determining a piece of actual effect information, which indicates a component actually affected by a cause component, and instructing a computer to carry out the following functions of:

(a) retrieving data of components which are assumed to be affected by the cause component from the hierarchical data in the storage unit of the computer, based on the piece of cause information inputted by the information input unit;

(b) extracting a piece of effect information which indicates the components assumed to be affected by the cause component from the pieces of effect information inputted by the information input unit based on the data of the components retrieved by said function (a); and (c) determining the piece of effect information extracted by said function (b) as the piece of actual effect information.

11. An apparatus according to claim 2, wherein said preprocessing unit includes a pseudorecovery information storage unit for storing a piece of pseudorecovery information, which indicates a component generating a cause information continuously during a predetermined time, and a second filter unit for removing the piece of cause information when the inputted piece of cause information corresponds with the component indicated by the piece of pseudorecovery information.

12. An apparatus according to claim 11, wherein said preprocessing unit includes a means for removing the cause information corresponding to the pseudorecovery information when the cause component corresponding to the cause information recovers from the state in which the component generates an identical piece of cause information continuously during a predetermined time.

* * * * *